(12) United States Patent
Kojima et al.

(10) Patent No.: US 9,285,029 B2
(45) Date of Patent: Mar. 15, 2016

(54) TWIN CLUTCH CONTROLLING APPARATUS

(71) Applicant: HONDA MOTOR CO., LTD., Tokyo (JP)

(72) Inventors: Hiroyuki Kojima, Wako (JP); Kazuhiko Nakamura, Wako (JP); Kazuyuki Fukaya, Wako (JP); Yoshiaki Nedachi, Wako (JP); Yasuyuki Mori, Wako (JP); Satoshi Honma, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 63 days.

(21) Appl. No.: 14/036,805

(22) Filed: Sep. 25, 2013

(65) Prior Publication Data

US 2014/0095039 A1 Apr. 3, 2014

(30) Foreign Application Priority Data

Sep. 28, 2012 (JP) ................. 2012-216984

(51) Int. Cl.
*G06F 7/00* (2006.01)
*G06F 17/00* (2006.01)
*F16H 59/02* (2006.01)
*F16D 48/06* (2006.01)
*F16D 21/02* (2006.01)
*G06F 19/00* (2011.01)

(52) U.S. Cl.
CPC ............ *F16H 59/0204* (2013.01); *F16D 21/02* (2013.01); *F16D 48/062* (2013.01); *F16D 48/064* (2013.01); *F16D 48/066* (2013.01); *F16D 2500/1045* (2013.01); *F16D 2500/1083* (2013.01); *F16D 2500/10412* (2013.01); *F16D 2500/1117* (2013.01); *F16D 2500/30808* (2013.01); *F16D 2500/50623* (2013.01); *F16D 2500/50676* (2013.01); *F16D 2500/70488* (2013.01)

(58) Field of Classification Search
USPC ................... 701/55, 67, 68; 74/335, 331, 336
See application file for complete search history.

(56) References Cited

U.S. PATENT DOCUMENTS

| 2007/0199395 A1* | 8/2007 | Ochi et al. ....................... 74/335 |
| 2009/0165582 A1* | 7/2009 | Tsunashima et al. ........... 74/331 |
| 2009/0165584 A1* | 7/2009 | Ishii ............................ 74/336 R |

(Continued)

FOREIGN PATENT DOCUMENTS

JP 2011-112094 A 6/2011

*Primary Examiner* — Helal A Algahaim
*Assistant Examiner* — Mahmoud Ismail
(74) *Attorney, Agent, or Firm* — Birch, Stewart, Kolasch & Birch, LLP

(57) ABSTRACT

A twin clutch controlling apparatus including a shift motor for carrying out a smooth changeover of a shift stage of a multi-speed transmission having a plurality of gear trains between a main shaft and a countershaft, a twin clutch configured from an odd number stage side clutch and an even number stage side clutch, a clutch actuator for controlling the twin clutch, and a manual operation clutch capacity arithmetic operation section for arithmetically operating, based on an operational amount of a clutch lever, a manual operation clutch capacity arithmetic operation value (tqc1tmt) corresponding to the manual operation. The twin clutch controlling apparatus further includes a manual operation clutch decision section for determining with a clutch capacity of which one of the odd number stage side clutch or the even number stage side clutch the manual operation clutch capacity arithmetic operation value (tqc1tmt) is to be interlocked.

9 Claims, 16 Drawing Sheets

(56) References Cited

U.S. PATENT DOCUMENTS

2010/0211275 A1* 8/2010 Kobayashi et al. ............ 701/55
2011/0125377 A1* 5/2011 Saitoh ............................ 701/67
2013/0139627 A1* 6/2013 Saitoh ............................ 74/331

* cited by examiner

| GEAR POSITION | ODD NUMBER SHIFT SIDE GEAR STATE | EVEN NUMBER SHIFT SIDE GEAR STATE |
|---|---|---|
| N-N | N | N |
| 1-N | 1 | N |
| 1-2 | 1 | 2 |
| N-2 | N | 2 |
| 3-2 | 3 | 2 |
| 3-N | 3 | N |
| 3-4 | 3 | 4 |
| N-4 | N | 4 |
| 5-4 | 5 | 4 |
| 5-N | 5 | N |
| 5-6 | 5 | 6 |
| N-6 | N | 6 |

TWIN CLUTCH CONTROLLING APPARATUS

CROSS-REFERENCE TO RELATED APPLICATIONS

The present application claims priority under 35 USC 119 to Japanese Patent Application No. 2012-216984 filed Sep. 28, 2012 the entire contents of which are hereby incorporated by reference.

BACKGROUND OF THE INVENTION

1. Field of the Invention

The present invention relates to a twin clutch controlling apparatus, and particularly to a twin clutch controlling apparatus for applying an automatic control and manual operation of a clutch in a complex manner.

2. Description of Background Art

In a clutch controlling apparatus for controlling a clutch of a transmission incorporated in a power source of a vehicle between a connection state and a disconnection state by an actuator, a configuration is known that includes manual operation means such as a clutch lever to allow an application of both an automatic control and manual operation of the clutch.

Japanese Patent Laid-Open No. 2011-112094 discloses a configuration of a transmission of the constant mesh type for a motorcycle that includes a twin clutch configured from a first clutch that takes charge of odd number of stage side gears and a second clutch that takes charge of even number of stage side gears. According to the configuration, the twin clutch is automatically controlled by an actuator, while an interposition of a manual operation according to an operation of a clutch lever is permitted.

Japanese Patent Laid-Open No. 2011-112094 describes that a clutch capacity corresponding to an operational amount of the clutch lever is calculated and reflected on a clutch capacity value for driving the actuator. However, Japanese Patent Laid-Open No. 2011-112094 still has room for improvement regarding the manner of the operation of the clutch lever to be particularly reflected on the clutch capacity in order not to provide a sense of discomfort about the power transmission of the clutch in response to a manual operation for the occupant.

SUMMARY AND OBJECTS OF THE INVENTION

The object of an embodiment of the present invention resides in the provision of a twin clutch controlling apparatus for solving the problem of the related art described above and wherein an interposition of a manual operation into an automatic control clutch can be carried out smoothly.

According to an embodiment of the present invention, a twin clutch controlling apparatus includes a multi-speed transmission (TM) having a plurality of gear trains between a main shaft (6, 7) on the input side and a countershaft (9) on the output side with a shift actuator (21) for carrying out a changeover of a shift stage of the multi-speed transmission (TM). A twin clutch (TCL) is configured from an odd number stage side clutch (CL1) and an even number stage side clutch (CL2) for connecting and disconnecting power transmission between the transmission (TM) and an engine (100). A clutch actuator (107) is provided for controlling the twin clutch (TCL) with a manual operation clutch capacity arithmetic operation section (185) for converting an operational amount of a clutch manual operation means (L) to arithmetically operate a manual operation clutch capacity arithmetic operation value (tqc1tmt) corresponding to the manual operation. The twin clutch controlling apparatus includes a manual operation clutch decision section (183) for determining with a clutch capacity (tqc1, tqc2) of which one of the odd number stage side clutch (CL1) or the even number stage side clutch (CL2) the manual operation clutch capacity arithmetic operation value (tqc1tmt) is to be interlocked.

According to an embodiment of the present invention, the decision by the manual operation clutch decision section (183) is executed at least based on a target gear position (gptgt) and a gear position (gearpos) at present.

According to an embodiment of the present invention, the gear position (gearpos) at present includes a position at which both of an even number stage side gear and an odd number stage side gear of the multi-speed transmission (TM) exhibit an in-gear state and a position at which only one of the odd number stage side gears or the even number stage side gears exhibits an in-gear state, and the manual operation clutch decision section (183) carries out, when the gear position (gearpos) at present is the position at which one of the odd number stage side gears or the even number stage side gears exhibits an in-gear state, a decision to interlock the manual operation clutch capacity arithmetic operation value (tqc1tmt) with the clutch capacity (tqc1, tqc2) on the side on which the in-gear state is exhibited.

According to an embodiment of the present invention, the manual operation clutch decision section (183) determines, where the gear position (gearpos) at present is a position at which both of the even number stage side gear and the odd number stage side gear are in an in-gear state, wherein one of the clutches which is positioned nearer to the target gear position (gptgt) as a selection candidate, carries out, when the clutch determined as the selection candidate and the currently decided clutch coincide with each other, a decision to interlock the manual operation clutch capacity arithmetic operation value (tqc1tmt) with the clutch capacity (tqc1, tqc2) of the selection candidate, and in contrast, carries out, when the clutch determined as the selection candidate and the currently decided clutch do not coincide with each other, a decision to interlock the manual operation clutch capacity arithmetic operation value (tqc1tmt) with that one of the clutches that is positioned nearer to the target gear position (gptgt) at a point in time at which the manual operation clutch capacity arithmetic operation value (tqc1tmt) becomes equal to or lower than the predetermined value or at another point in time at which the manual operation clutch capacity arithmetic operation value (tqc1tmt) changes in the connection direction.

According to an embodiment of the present invention, the gear position (gearpos) at present includes a neutral position (N-N) at which none of the even number stage side gears and the odd number stage side gears of the multi-speed transmission (TM) is in an in-gear state, and when the gear position (gearpos) at present is the neutral position (N-N), the manual operation clutch decision section (183) carries out a decision to interlock the manual operation clutch capacity arithmetic operation value (tqc1tmt) with the odd number stage side clutch capacity (tqc1).

According to an embodiment of the present invention, the twin clutch controlling apparatus includes the manual operation clutch decision section for determining with a clutch capacity of which one of the odd number stage side clutch or the even number stage side clutch the manual operation clutch capacity arithmetic operation value is to be interlocked. Therefore, it is possible to easily determine a clutch to be made a target of a manual operation. Further, by interlocking an operation of the clutch manual operation means such as a clutch lever rapidly with the odd number stage side clutch or the even number stage side clutch, a sense of togetherness between the manual operation and the actual action of the clutch can be enhanced.

According to an embodiment of the present invention, the decision by the manual operation clutch decision section is executed at least based on a target gear position and a gear position at present. Therefore, a decision of high reliability can be executed based on a plurality of parameters that can be detected by sensors.

According to an embodiment of the present invention, the gear position at present includes a position at which both of an even number stage side gear and an odd number stage side gear of the multi-speed transmission exhibit an in-gear state and a position at which only one of the odd number stage side gears and the even number stage side gears exhibits an in-gear state. Further, the manual operation clutch decision section carries out, when the gear position at present is the position at which one of the odd number stage side gears and the even number stage side gears exhibits an in-gear state, a decision to interlock the manual operation clutch capacity arithmetic operation value with the clutch capacity on the side on which the in-gear state is exhibited. Therefore, a clutch on the side on which the manual operation clutch capacity arithmetic operation value can be interlocked effectively can be determined in response to the gear position at present.

According to an embodiment of the present invention, the manual operation clutch decision section determines, where the gear position at present is a position at which both of the even number stage side gear and the odd number stage side gear are in an in-gear state, that one of the clutches that is positioned nearer to the target gear position as a selection candidate, and carries out, when the clutch determined as the selection candidate and the currently decided clutch coincide with each other, a decision to interlock the manual operation clutch capacity arithmetic operation value with the clutch capacity of the selection candidate, and, in contrast, carries out, when the clutch determined as the selection candidate and the currently decided clutch do not coincide with each other, a decision to interlock the manual operation clutch capacity arithmetic operation value with that one of the clutches that is positioned nearer to the target gear position at a point in time at which the manual operation clutch capacity arithmetic operation value becomes equal to or lower than the predetermined value or at another point in time at which the manual operation clutch capacity arithmetic operation value changes in the connection direction. Therefore, when the clutch determined as a selection candidate and the decided clutch coincide with each other, the clutch with which the manual operation clutch capacity arithmetic operation value is to be interlocked can be determined immediately. In contrast, when the clutch determined as a selection candidate and the decided clutch do not coincide with each other, an appropriate clutch can be determined in response to a later variation of the manual operation clutch capacity arithmetic operation value.

According to an embodiment of the present invention, the gear position at present includes a neutral position at which none of the even number stage side gears and the odd number stage side gears of the multi-speed transmission is in an in-gear state, and, when the gear position at present is the neutral position, the manual operation clutch decision section carries out a decision to interlock the manual operation clutch capacity arithmetic operation value with the odd number stage side clutch capacity. Therefore, when the gear position at present is the neutral position, assuming that the first speed gear is used upon starting, the manual operation clutch capacity arithmetic operation value can be interlocked with the odd number stage side clutch.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
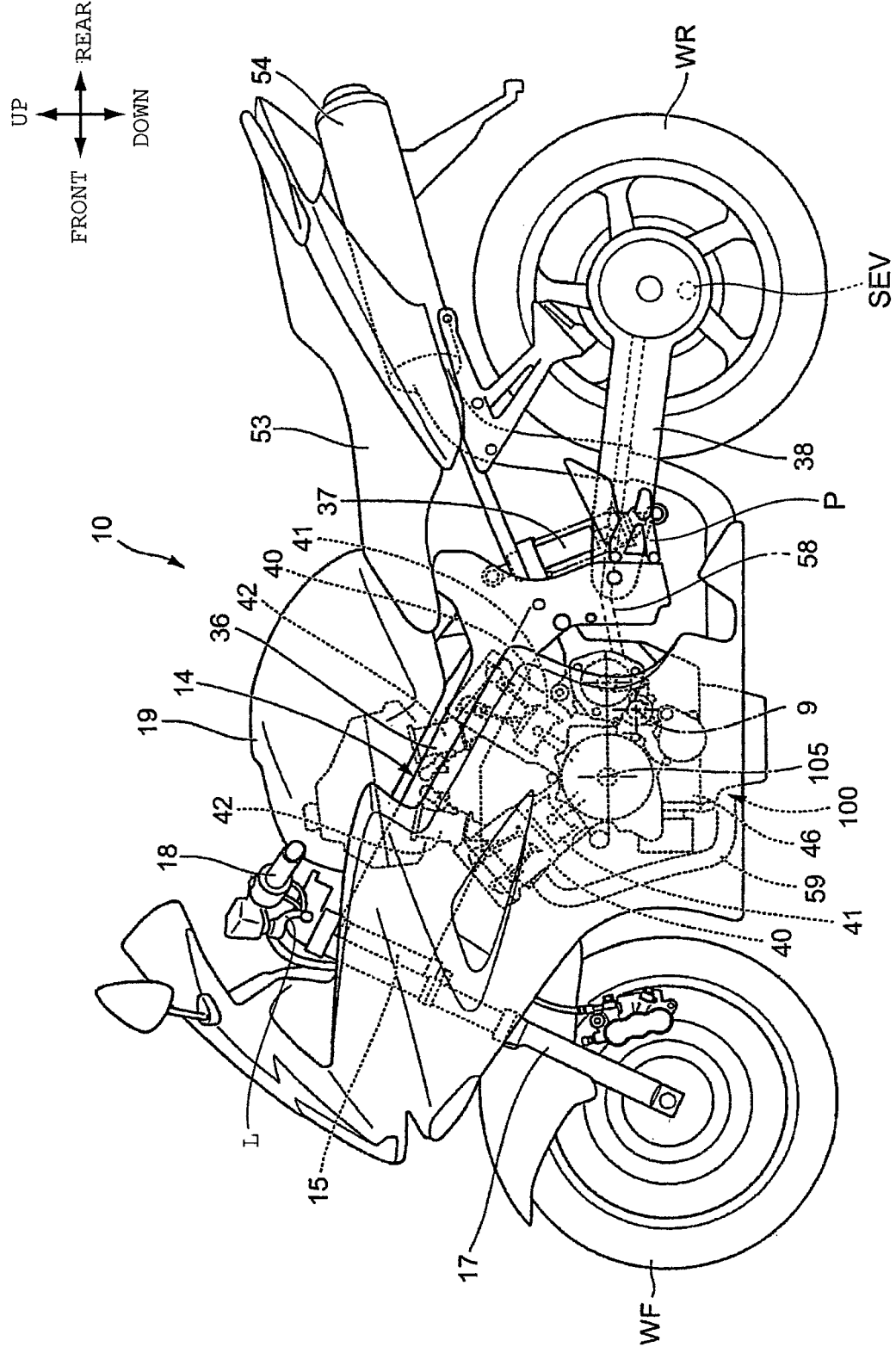
FIG. 1 is a left side elevational view of a motorcycle to which a transmission control apparatus for a twin clutch type automatic transmission according to an embodiment of the present invention is applied.
Figure 2:
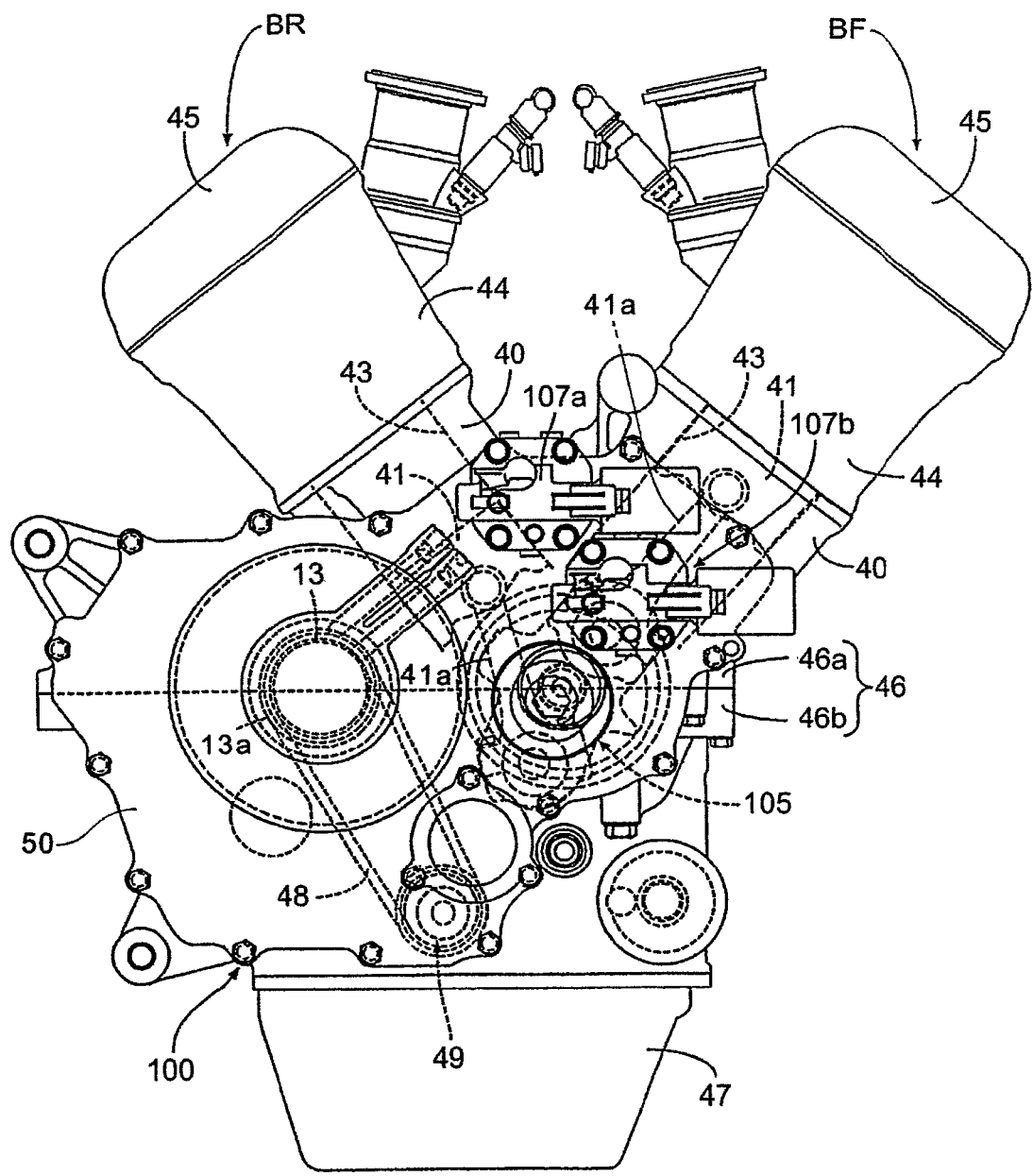
FIG. 2 is a right side elevational view of an engine as a power source of the motorcycle.

In the following, a preferred embodiment of the present invention is described in detail with reference to the drawings. FIG. 1 is a left side elevational view of a motorcycle 10 to which a transmission controlling apparatus for a twin clutch type automatic transmission according to an embodiment of the present invention is applied. FIG. 2 is a right side elevational view of an engine 100 as a power source of the motorcycle 10. A vehicle body frame 14 of the motorcycle 10 has a pair of left and right main pipes 36, and a head pipe 15 is provided on the vehicle body front side of the main pipes 36. A pair of left and right front forks 17 support a front wheel WF for rotation thereon and support a steering handlebar 18. The front forks 17 are supported for pivotal motion with respect to the head pipe 15.

The engine 100 is suspended below the main pipes 36 and is a V-type four-cylinder engine wherein front and rear cylinders are disposed with a predetermined nip angle formed therebetween. A piston 41, a valve mechanism and so forth which slidably move in a cylinder block 40 have a similar configuration among the four cylinders. A crankshaft 105, a main shaft 13 and a countershaft 9 are accommodated in a crankcase 46. The crankshaft 105 supports connecting rods 41*a* (refer to FIG. 2), on each of which a piston 41 is supported, for rotation thereon. The main shaft 13 and the countershaft 9 have a plurality of gear pairs, which configure a transmission, attached thereto.

Between the front and rear cylinder blocks, air funnels 42 are disposed. The air funnels 42 introduce fresh air having passed through an air cleaner box disposed at a lower portion of a fuel tank 19 to intake ports of the cylinders. Each air funnel 42 has a fuel injection valve attached thereto. A muffler 54 is disposed below a seat 53 and exhausts combustion gas introduced to the rear side of the vehicle body by an exhaust pipe 59.

A swing arm 38 is supported for rocking motion at a rear lower portion of the main pipes 36. The swing arm 38 is suspended by shock units 37 and supports a rear wheel WR for rotation thereon. A drive shaft 58 is disposed inside the swing arms 38 and transmits rotational driving force of the engine 100 outputted from the countershaft 9 to the rear wheel WR. A vehicle speed sensor SEV is provided in the proximity of an axle of the rear wheel WR and detects a rotational speed of the rear wheel WR.

A clutch lever L is attached to the left side of the steering handlebar 18 in the vehicle widthwise direction and servers as clutch manual operation means for connecting and disconnecting transmission of a driving force between the engine 100 and the rear wheel WR. A shift pedal P is attached in the proximity of a foot placing step on the left side in the vehicle widthwise direction and serves as shift manual operation means for carrying out a shift change of a transmission TM.

Referring to FIG. 2, each of a front bank Bf and a rear bank BR which form the engine 100 is configured from a cylinder head 44 attached to the upper side of a cylinder block 40 for accommodating a valve mechanism therein and a head cover 45 that covers an upper end of the cylinder head 44. A piston 41 slidably moves along an inner circumference of a cylinder 43 formed in the cylinder blocks 40. The crankcase 46 is configured from an upper case half 46*a* formed integrally with the cylinder blocks 40 and a lower case half 46*b* to which an oil pan 47 is attached.

A water pump 49 for pressure feeding cooling water is driven to rotate by an endless chain 48 wrapped around a sprocket wheel 13*a* formed on the main shaft 13. A clutch cover 50 is attached to a side face on the right side of the crankcase 46 in the vehicle widthwise direction.

The engine 100 in the present embodiment applies, as a hydraulic clutch for connection and disconnection of rotational driving force to and from the transmission, a clutch of the twin clutch type configured from a first clutch and a second clutch. The hydraulic pressure to be supplied to the twin clutch can be controlled by an actuator, and a first valve 107*a* and a second valve 107*b* as actuators controlling the two clutches are attached to a right side portion of the engine 100. The twin clutch TCL is driven to connect and disconnect by a combination of automatic control in response to the engine speed, vehicle speed and so forth and a driving instruction of an occupant by an operation of the clutch lever L.

Figure 3:
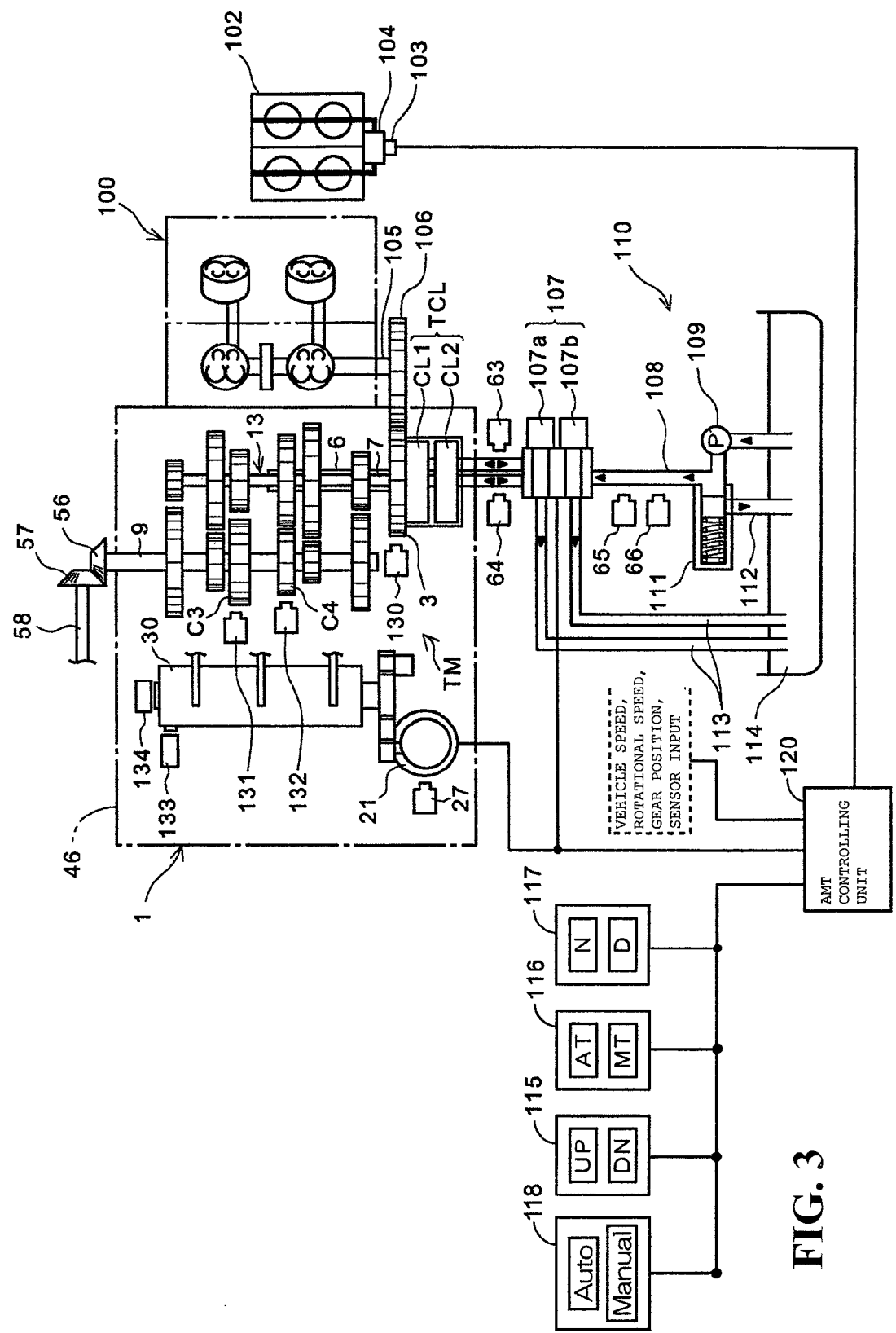
FIG. 3 is a system diagram of an AMT and peripheral apparatus.

FIG. 3 is a system diagram of an automatic manual transmission (hereinafter referred to as AMT) 1 as an automatic transmission and peripheral apparatus of the AMT 1. The AMT 1 is a twin clutch type automatic transmission apparatus that connects and disconnects the rotational driving force of the engine by the two clutches disposed on the main shaft. The AMT 1 accommodated in the crankcase 46 is controlled and driven by a clutch hydraulic system 110 and an AMT controlling unit 120. The AMT controlling unit 120 includes clutch controlling means for controlling the driving of the valve 107 as a clutch actuator configured from the first valve 107*a* and the second valve 107*b*. Further, the engine 100 includes a throttle body 102 of the throttle-by-wire type in which a throttle valve motor 104 for opening and closing the throttle valve is provided.

The AMT 1 includes a transmission TM of six forward stages, a twin clutch TCL configured from a first clutch CL1 and a second clutch CL2, a shift drum 30, and a shift motor (shift actuator) 21 for rotating the shift drum 30. The shift motor 21 is driven to rotate by a combination of automatic control in response to an engine speed, a vehicle speed and so forth and a driving instruction of an occupant by an operation of the shift pedal P.

A large number of gears which configure the transmission TM are coupled to or loosely fitted on the main shaft 13 or the countershaft 9. The main shaft 13 is configured from an inner main shaft 7 and an outer main shaft 6. The inner main shaft 7 is coupled to the first clutch CL1 while the outer main shaft 6 is coupled to the second clutch CL2. Transmission gears are provided on the main shaft 13 and the countershaft 9 such that they are displaceable in the axial direction of the main shaft 13 and the countershaft 9. Shift forks 71, 72, 81 and 82 are engaged at end portions thereof with the transmission gears and a plurality of guide grooves formed on the shift drum 30.

A primary driving gear 106 is coupled to the crankshaft 105 of the engine 100 and is held in mesh with a driven gear 3. The primary driven gear 3 is connected to the inner main shaft 7 through the first clutch CL1 and connected to the outer main shaft 6 through the second clutch CL2. Further, the AMT 1 includes an inner main shaft rotational speed sensor 131 and an outer main shaft rotational speed sensor 132 that measure the rotational speed of predetermined transmission gears on the countershaft 9 to detect the rotational speed of the inner main shaft 7 and the outer main shaft 6, respectively.

The inner main shaft rotational speed sensor 131 detects the rotational speed of a driven side transmission gear C3 that is attached for rotation but against sliding movement on the countershaft 9 and is held in meshing engagement with a transmission gear attached against rotation on the inner main shaft 7. Meanwhile, the outer main shaft rotational speed sensor 132 detects the rotational speed of a driven side transmission gear C4 that is attached for rotation but against sliding moment on the countershaft 9 and is held in meshing engagement with a transmission gear attached against rotation to the outer main shaft 6.

A bevel gear 56 is coupled to an end portion of the countershaft 9. The bevel gear 56 meshes with another bevel gear 57 coupled to the drive shaft 58 to transmit the rotational driving force of the countershaft 9 to the rear wheel WR. Further, in the AMT 1, an engine speed sensor 130, a gear position sensor 134, a shifter sensor 27, and a neutral switch 133 are provided. The engine speed sensor 130 is disposed in an opposing relationship to an outer periphery of the primary driven gear 3. The gear position sensor 134 detects a gear stage position of the transmission TM based on the rotational position of the shift drum 30. The shifter sensor 27 detects a pivoted position of a shifter that is driven by the shift motor 21. The neutral switch 133 detects that the shift drum 30 is at a neutral position. A throttle opening sensor 103 is provided on the throttle body 102 and detects a throttle opening.

The clutch hydraulic system 110 is configured such that it uses both the lubricating oil for the engine 100 and hydraulic oil for driving the twin clutch. The clutch hydraulic system 110 includes an oil tank 114, and a pipe line 108 for feeding oil (hydraulic oil) in the oil tank 114 to the first clutch CL1 and the second clutch CL2. A hydraulic pump 109 as a hydraulic supply source and a valve (electromagnetic control valve) 107 as a clutch actuator are provided on the pipe line 108. On a return pipe line 112 connected to the pipe line 108, a regulator 111 is disposed for normally keeping the hydraulic pressure to be supplied to the valve 107 to a fixed value. The valve 107 is configured from the first valve 107a and the second valve 107b that can supply oil pressure to the first clutch CL1 and the second clutch CL2, respectively. An oil return pipe line 113 is provided for each of the first valve 107a and the second valve 107b.

A first hydraulic pressure sensor 63 is provided on a pipe line that connects the first valve 107a and the first clutch CL1 to each other and measures the hydraulic pressure generated in the pipe line, namely, the hydraulic pressure generated in the first clutch CL1. Similarly, a second hydraulic pressure sensor 64 is provided on another pipe line that connects the second valve 107b and the second clutch CL2 to each other and measures the hydraulic pressure generated in the second clutch CL2. Further, on the pipe line 108 that connects the hydraulic pump 109 and the valve 107 to each other, a main hydraulic pressure sensor 65 and a third hydraulic pressure sensor 66 as oil temperature detection means are provided.

To the AMT controlling unit 120, a shift mode changeover switch 116, a shift switch 115, a neutral select switch 117 and a clutch control mode changeover switch 118 are connected. The shift mode changeover switch 116 carries out changeover between an automatic shift (AT) mode and a manual shift (MT) mode of the transmission TM. The shift switch 115 serves as shift manual operation means that carries out shift instruction for shift up (UP) or shift down (DN). The neutral select switch 117 carries out a changeover between the neutral (N) position and the drive (D) position. The clutch control mode changeover switch 118 carries out a changeover of a control mode for clutch operation. The clutch control mode changeover switch 118 is a push type switch that exhibits an on state from an off state only when it is pushed. The clutch control mode changeover switch 118 can arbitrarily carry out a changeover between an Auto mode in which clutch control is carried out automatically and a Manual mode in which the clutch is driven in response to an operation of the clutch lever L, under a predetermined condition. The switches are provided on handlebar switches of the steering handlebar 18.

It is to be noted that the shift pedal P does not have a mechanical connection to the shift drum 30 but functions as a switch that sends a shifting request signal to the AMT controlling unit 120 similarly to the shift switch 115. Further, the clutch lever L does not have a mechanical connection to the twin clutch but functions as a switch that sends a clutch operation request signal to the AMT controlling unit 120.

The AMT controlling unit 120 includes a central processing unit (CPU) and controls the valve (clutch actuator) 107 and the shift motor (shift actuator) 21 in response to output signals of the sensors and the switches described above to change the shift position of the AMT 1 automatically or semi-automatically. Upon selection of the AT mode, the shift position is changed over automatically in response to information of the vehicle speed, engine speed, throttle opening and so forth. In contrast, upon selection of the MT mode, the transmission TM is shifted up or down in response to an operation of the shift switch 115 or the shift pedal P. It is to be noted that, also upon selection of the MT mode, auxiliary automatic shift control for preventing an overspeed, installation and so forth of the engine can be executed.

In the clutch hydraulic system 110, a hydraulic pressure is applied to the valve 107 by the hydraulic pump 109 and is controlled by the regulator 111 so that it does not exceed an upper limit value. If the valve 107 is opened in accordance with an instruction from the AMT controlling unit 120, then the hydraulic pressure is applied to the first clutch CL1 or the second clutch CL2 to connect the primary driven gear 3 to the inner main shaft 7 or the outer main shaft 6 through the first clutch CL1 or the second clutch CL2. In particular, both of the first clutch CL1 and the second clutch CL2 are normally open type hydraulic clutches. If the valve 107 is closed to stop the application of the hydraulic pressure, then the first clutch CL1 or the second clutch CL2 is urged in a direction in which the connection between the inner main shaft 7 and the outer main shaft 6 is cut by a return spring (not shown) built therein.

The valve 107 which opens and closes the pipe lines that connect the pipe line 108 and the two clutches to each other to drive the clutches is configured such that the AMT controlling unit 120 adjusts the driving signal so that the time and so forth required to place the pipe lines from a fully closed state to a fully open state can be changed arbitrarily.

The shift motor 21 rotates the shift drum 30 in accordance with an instruction from the AMT controlling unit 120. When the shift drum 30 rotates, the shift forks 71, 72, 81 and 82 are displaced in an axial direction of the shift drum 30 in accordance with the shape of guide grooves formed on the outer periphery of the shift drum 30, whereupon the meshing relationship between the gears on the countershaft 9 and the main shaft 13 changes.

The AMT 1 according to the present embodiment is configured such that the inner main shaft 7 coupled to the first clutch CL1 supports odd number stage side gears (first, third and fifth stages) and the outer main shaft 6 coupled to the second clutch CL2 supports even number stage side gears (second, fourth and sixth stages). Accordingly, for example, while the motorcycle runs with an odd number stage side gear, supply of the pressure oil to the first clutch CL1 continues and the connection state is maintained. Then, upon a shift change, the transmission gear that transmits a driving force is changed over by carrying out a clutch switching operation in a state in which the transmission gears before and after the shift change remain in a meshing state.

Figure 4:
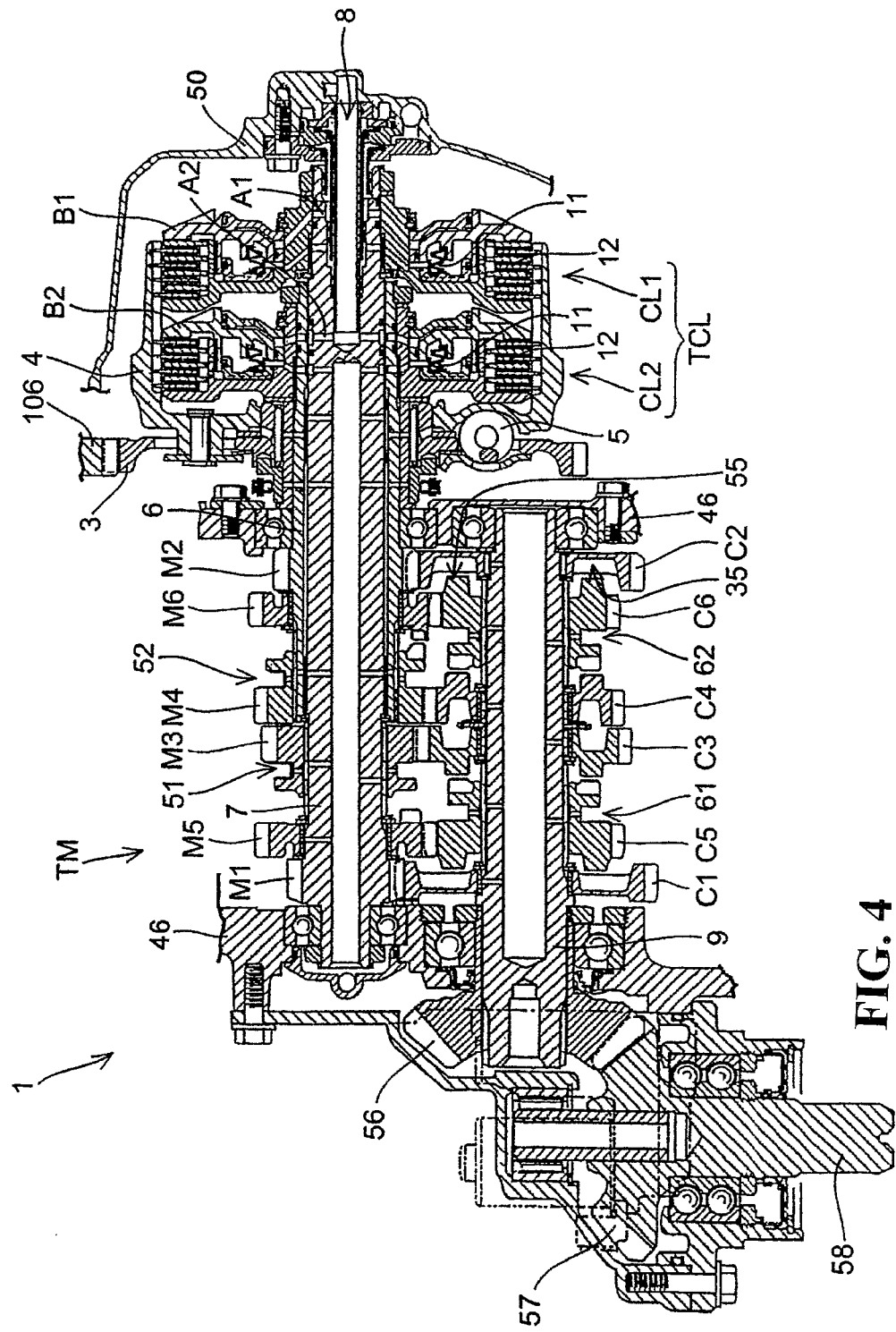
FIG. 4 is an enlarged sectional view of the transmission.

FIG. 4 is an enlarged sectional view of the transmission TM. Like reference characters to those used in the foregoing description denote like or equivalent portions. A rotational driving force is transmitted from the crankshaft 105 of the engine 100 to the primary driven gear 3 having a shock absorption mechanism 5 thereon through the primary driving gear 106. Then, the rotational driving force is transmitted from the twin clutch TCL to the countershaft 9 to which the bevel gear 56 is attached through the outer main shaft 6 and the inner main shaft 7 supported for rotation in the outer main shaft 6 and further through the six gear pairs provided between the main shaft 13 (outer main shaft 6 and inner main shaft 7) and the countershaft 9. The rotational driving force transmitted to the bevel gear 56 is transmitted to the drive shaft 58 with the rotational direction thereof being changed to the vehicle body rear side by the bevel gear 57 with which the bevel gear 56 meshes.

The transmission TM has six transmission gear pairs between the main shaft and the countershaft and can select which gear pair should be used to output the rotational driving force depending upon a combination of the position of a slidably movable gear attached for sliding movement in an axial direction of each shaft and the connection or disconnection state of the first clutch CL1 and the second clutch CL2. The twin clutch TCL is disposed in the inside of a clutch case 4 that rotates integrally with the primary driven gear 3. The first clutch CL1 is attached against rotation on the inner main shaft 7 while the second clutch CL2 is attached against rotation to the outer main shaft 6. A clutch plate 12 is disposed between the clutch case 4 and each of the two clutches. The clutch plate 12 is configured from four driving friction plates supported against rotation on the clutch case 4 and four driven friction plates supported against rotation on each of the two clutches.

The first clutch CL1 and the second clutch CL2 are configured such that, if oil pressure is supplied thereto from the hydraulic pump 109 (refer to FIG. 3), then a friction force is generated on the clutch plate 12 so that the first clutch CL1 or the second clutch CL2 is placed into a connection state. A distributor 8 is embedded in a wall face of the clutch cover 50 attached to the crankcase 46 and forms two hydraulic paths of a double pipe shape in the inside of the inner main shaft 7. If a hydraulic pressure is supplied to the distributor 8 through the first valve 107a and a hydraulic pressure is supplied into an oil path A1 formed in the inner main shaft 7, then a piston B1 is slidably moved in a direction indicated in FIG. 4 against the biasing force of an elastic member 11 such as a spring so that the first clutch CL1 is changed over into a connection state. On the other hand, if a hydraulic pressure is supplied into another oil path A2, then a piston B2 is slidably moved to the left in FIG. 4 to change over the second clutch CL2 into a connection state. The pistons B1 and B2 of the clutches CL1 and CL2 are configured such that, if the application of the hydraulic pressure stops, then they return to their initial position by the biasing force of the elastic member 11.

By such a configuration as described above, a rotational driving force of the primary driven gear 3 rotates the clutch case 4 unless a hydraulic pressure is supplied to the first clutch CL1 or the second clutch CL2. However, if a hydraulic pressure is supplied, then the outer main shaft 6 or the inner main shaft 7 is driven to rotate integrally with the clutch case 4. At this time, by adjusting the magnitude of the supplied hydraulic pressure, an arbitrary half clutch state can be obtained.

The inner main shaft 7 connected to the first clutch CL1 supports driving gears M1, M3 and M5 for the odd number stages (first, third and fifth speeds). The first speed driving gear M1 is formed integrally with the inner main shaft 7. The third speed driving gear M3 is attached for sliding movement in an axial direction but against rotation in a circumferential direction to the inner main shaft 7 through a spline meshing engagement therebetween. The fifth speed driving gear M5 is attached against sliding movement in an axial direction and for rotation in a circumferential direction to the inner main shaft 7.

Meanwhile, the outer main shaft 6 connected to the second clutch CL2 supports driving gears M2, M4 and M6 for the even number stages (second, fourth and sixth speeds). The second speed driving gear M2 is formed integrally with the outer main shaft 6. The fourth speed driving gear M4 is attached for sliding movement in an axial direction but against rotation in a circumferential direction to the outer main shaft 6 through spline meshing engagement therebetween. The sixth speed driving gear M6 is attached against sliding movement in the axial direction but for rotation in a circumferential direction to the outer main shaft 6.

The countershaft 9 supports drive gears C1 to C6 for meshing with the driving gears M1 to M6. The first to fourth speed driven gears C1 to C4 are attached against sliding movement in an axial direction but for rotation in a circumferential direction to the countershaft 9. The fifth and sixth speed driven gears C5 and C6 are attached for sliding movement in the axial direction but against rotation in a circumferential direction to the countershaft 9.

Of the gear trains described above, the driving gears M3 and M4 and the driven gears C5 and C6, namely, the "slidably movable gears" which can slidably move in the axial direction, are configured so as to be slidably moved by a movement of a shift fork hereinafter described. Each of the slidably movable gears has an engaging groove 51, 52, 61 or 62 formed therein for engagement by a pawl portion of the shift fork. It is to be noted that the inner main shaft rotational speed sensor 131 (refer to FIG. 3) detects the rotational speed of the third speed driven gear C3 and the outer main shaft rotational speed sensor 132 detects the rotational speed of the speed fourth driven gear C4 as described hereinabove.

Meanwhile, the transmission gears (driving gears M1, M2, M5 and M6 and driven gears C1 to C4) other than the slidably movable gears described above, namely, the "slidably immovable gears" which cannot slidably move in the axial direction, are configured such that they carry out connection and disconnection of the rotational driving force to and from an adjacent slidably movable gear. By the configuration described above, the AMT 1 according to the present embodiment can arbitrarily select one gear pair for transmitting the rotational driving force depending upon the position of the slidably movable gears and the connection or disconnection state of the clutches CL1 and CL2.

In the present embodiment, a dog clutch mechanism is applied for the transmission of the rotational driving force between a slidably movable gear and a slidably immovable gear. The dog clutch mechanism makes low-loss transmission of the rotational driving force through meshing engagement between concave and convex shapes configured from dog teeth and dog holes. In the present embodiment, the dog clutch mechanism is configured such that, for example, four dog teeth 55 formed on the sixth speed driven gear C6 mesh with four dog holes 35 formed on the second speed driven gear C2.

Figure 5:
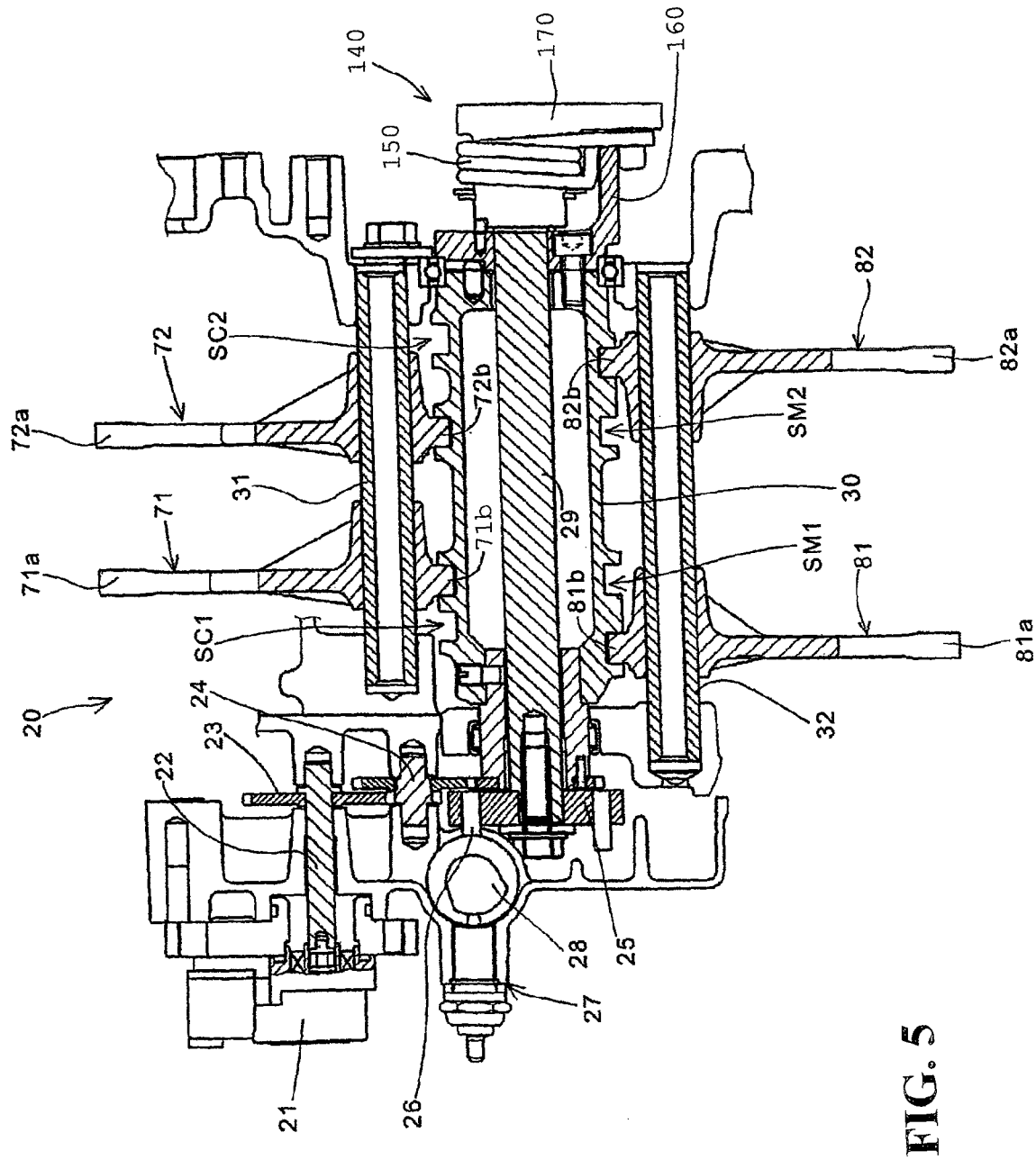
FIG. 5 is an enlarged sectional view of a transmission mechanism.
Figure 6:
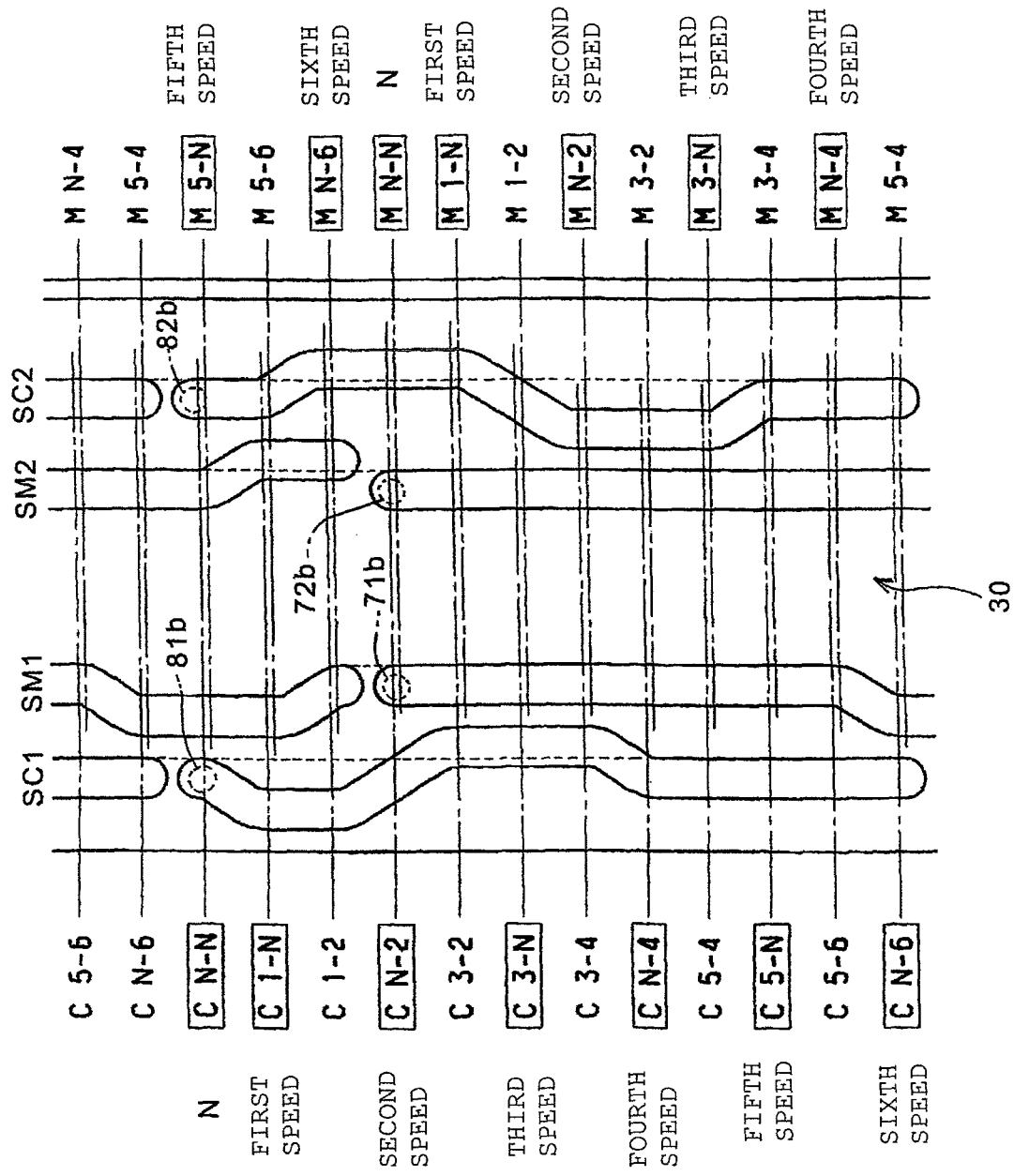
FIG. 6 is a developed view showing a shape of guide grooves of a shift drum.

FIG. 5 is an enlarged sectional view of a transmission mechanism 20. Meanwhile, FIG. 6 is a developed view showing a shape of guide groups of the shift drum 30. The transmission mechanism 20 includes the four shift forks 71, 72 and 81, 82 attached for sliding movement to two guide shafts 31 and 32, respectively, in order to drive the four slidably movement gears described hereinabove. The four shift forks have provided thereon guide pawls (71a, 72a, 81a and 82a) for engaging with the slidably movable gears and cylindrical convex portions (71b, 72b, 81b and 82b) for engaging with the guide grooves formed on the shift drum 30.

The shift fork 71 for engaging with the third speed driving gear M3 and the shift fork 72 for engaging with the fourth speed driving gear M4 are attached to the guide shaft 31. Meanwhile, the shift fork 81 for engaging with the fifth speed driven gear C5 and the shift fork 82 for engaging with the sixth speed driven gear C6 are attached to the guide shaft 32 on the other side.

Guide grooves SM1 and SM2 for being engaged by the shift forks 71 and 72 on the main shaft side and guide grooves SC1 and SC2 for being engaged by the shift forks 81 and 82 on the countershaft side are formed on the surface of the shift drum 30 disposed in parallel to the guide shafts 31 and 32, respectively. Consequently, the slidably movable gears M3, M4 and C5, C6 are driven along the shape of the four guide grooves upon rotation of the shift drum 30.

The shift drum 30 is driven to rotate to a predetermined position by the shift motor 21. The rotational driving force of the shift motor 21 is transmitted to a shift drum shaft 29, that supports the shift drum 30 of a hollow cylindrical shape, through a first gear 23 fixed to a rotary shaft 22 and a second gear 24 meshing with the first gear 23. The shift drum shaft 29 is connected to the shift drum 30 through a lost motion mechanism 140.

The lost motion mechanism 140 is configured such that the shift drum shaft 29 and the shift drum 30 are connected to each other by a torsion coil spring 150. The lost motion mechanism 140 is a mechanism wherein, for example, even if the shift drum 30 cannot be rotated in a scheduled manner due to a failure in the meshing engagement of the dog clutch, a motion of the shift motor 21 is temporarily absorbed by the torsion coil spring 150 so that an excessive load is not applied to the shift motor 21.

The lost motion mechanism 140 is configured from a driving rotor 170 attached to an end portion of the shift drum shaft 29, a driven rotor 160 attached to an end portion of the shift drum 30, and a torsion coil spring 150 that connects the driving rotor 170 and the driven rotor 160 to each other. Consequently, if the shift drum 30 is placed into a rotatable state in the state in which the motion of the shift motor 21 is temporarily absorbed, then the shift drum 30 is rotated to the predetermined position by the biasing force of the torsion coil spring 150.

In order for the gear position sensor 134 (refer to FIG. 3) to detect an actual rotational angle of the shift drum 30, it is disposed so as to detect the rotational angle of the shift drum 30 or the driven rotor 160. The shifter sensor 27 can detect whether or not the shift motor 21 is at a predetermined position based on the position of a cam 28 rotated by a pin 26 planted on a shifter 25 fixed to the shift drum shaft 29.

A positional relationship between the rotational position of the shift drum 30 and the four shift forks is described with reference to the developed view of FIG. 6. The guide shafts 31 and 32 are disposed at positions spaced by approximately 90° in a circumferential direction with reference to the rotary shaft of the shift drum 30. For example, where the rotational position of the shift drum 30 is the neutral (N) position, the shift forks 81 and 82 are positioned at a position indicated by "C N-N" on the left side in FIG. 6 while the shift forks 71 and 72 are positioned at a position indicated by "M N-N" on the right side in FIG. 6.

In FIG. 6, the position of each cylindrical convex portion (71b, 72b, 81b, 82b) of the shift forks in the neutral position is indicated by a broken line circle. Meanwhile, predetermined rotational positions represented by indications following the indication "C N-N" on the left side in FIG. 6 and predetermined rotational positions represented by indications following the indication "M N-N" on the right side in FIG. 6 are provided at intervals of 30 degrees. It is to be noted that, from among the predetermined rotational angles, a "neutral waiting (N waiting)" position hereinafter described is indicated by a quadrangular shape.

The sliding movement positions of the shift forks determined by the guide grooves are configured such that, while the guide grooves SM1 and SM2 on the main shaft side have two positions of a "left position" and a "right position," the guide grooves SC1 and SC2 on the countershaft side have three positions of a "left position," a "mid position" and a "right position."

When the shift drum 30 is at the neutral position, the shift forks are positioned such that the shift fork 81 is at the mid position, the shift fork 82 at the mid position, the shift fork 71 at the right position and the shift fork 72 at the left position. This is a state in which none of the four slidably movable gears which are driven by the shift forks mesh with adjacent slidably immovable gears. Accordingly, even if the first clutch CL1 or the second clutch CL2 is connected, the rotational driving force of the primary driven gear 3 is not transmitted to the countershaft 9.

Then, if the shift drum 30 is rotated from the neutral position described hereinabove to the position ("C 1-N" and "M 1-N") corresponding to the first speed gear, then the shift fork 81 changes over from the mid position to the left position to change over the fifth speed driven gear C5 from the mid position to the left position. Consequently, the fifth speed driven gear C5 is brought into meshing engagement with the first speed driven gear C1 through the dog clutch to establish a state in which the rotational driving force can be transmitted. If, in this state, the first clutch CL1 is changed over to a connection state, then the rotational driving force is transmitted in order of the inner main shaft 7, first speed driving gear M1, first speed driven gear C1, fifth speed driven gear C5, and countershaft 9.

Then, if a shift instruction to the second speed is inputted after completion of the speed change to the first gear, then the shift drum 30 is automatically rotated by 30 degrees in a shift up direction. This rotational movement is called "preliminary upshifting" for completing the speed change only by the changeover of the connection state of the twin clutch TCL when the shift instruction to the second speed is issued. By this preliminary upshifting, the two guide shafts move to the positions of the indications "C 1-2" and "M 1-2" on the left and right sides in FIG. 6, respectively.

The change of the guide grooves involved in this preliminary upshifting is only the changeover of the guide groove SC2 from the mid position to the right position. By this changeover, the shift fork 82 moves to the right position to bring the sixth speed driven gear C6 into meshing engagement with the second speed driven gear C2 through the dog clutch. At a point in time at which the preliminary upshifting is completed, since the second clutch CL2 is in the disconnected state, the outer main shaft 6 is driven to rotate by the viscosity of the lubricating oil filled between the outer main shaft 6 and the inner main shaft 7.

By the preliminary upshifting described above, the twin clutch TCL becomes ready for transmission of the rotational driving force through the second gear. If a shifting instruction to the second speed is issued in this state, then the first clutch CL1 is disconnected and the second speed driven gear C2 is changed over to a connected state. By this switching action of the clutch, the shifting action to the second gear is completed immediately without interruption of the rotational driving force.

Then, if a shifting instruction to the third speed is issued after the completion of the shifting action from the first speed to the second speed, then the preliminary upshifting for completing the shifting action from the second speed to the third speed only by switching of the clutch is executed. By the preliminary upshifting from the second speed to the third speed, the guide shaft on the counter shaft side moves from the position of the indication "C 1-2" on the left side in FIG. 6 to the position of the indication "C 3 -2" and the guide shaft of the main shaft side moves from the position of the indication "M 1-2" on the right side in FIG. 6 to the position of the indication "M 3-2." The change of the guide grooves involved in the movement is only changeover of the guide groove SC1 from the left position to the right position. By the changeover, the shift fork 81 moves from the left position to the right position and the fifth speed driven gear C5 and the speed third driven gear C3 are brought into meshing engagement with each other through the dog clutch.

After the preliminary upshifting from the second speed to the third speed is completed, a state is established in which a shifting action from the second speed to the third speed is completed only by executing an action of changing over the connection state of the twin clutch TCL from the first clutch CL1 to the second clutch CL2, namely, only by executing a switching action of the clutch. This preliminary upshifting is thereafter executed similarly until selection of the fifth speed gear is carried out. Upon the preliminary upshifting from the second speed to the third speed described above, the guide groove SC1 passes the mid position of the indication "C N-2" on the left side in FIG. 6, namely, the position at which meshing engagement through the dog clutch is not carried out. The rotational position of the shift drum 30 is detected by the gear position sensor 134, and the rotational speed of the shift drum 30 can be finely adjusted by the shift motor 21. Consequently, it is possible to differentiate between the rotational speed from the position of the indication "C 1-2" to the position of the indication "C N-2 " on the left side in FIG. 6, namely, the speed when the meshing engagement of the dog clutch is canceled between the drive gears C1 and C5, and the rotational speed from the position of the indication "C N-2" to the position of the indication "C 3-2," namely, the speed when the dog clutch is placed into meshing engagement between the driven gears C5 and C3. Or, "neutral waiting" wherein the shift drum 30 stops for a predetermined period of time at the position wherein the indication "C N-2" can be carried out. With such a configuration of the AMT 1 as described above, for example, during driving with the second speed gear, the rotational position of the shift drum 30 can be changed arbitrarily among the positions of "1-2," "N-2" and "3-2."

If the neutral waiting control for temporarily stopping the shift drum 30 at the "neutral waiting" position is executed at a predetermined timing, then a shift shock which is liable to occur upon connection and disconnection of the dog clutch can be reduced. It is to be noted that the driving timing or the driving speed of the shift drum 30 can be adjusted suitably also in response to the number of the shift stage upon shifting, the engine speed and so forth.

It is to be noted that, when the shift drum 30 is at the "neutral waiting" position, one shift gear pair on the odd number stage side and the even number stage side is in the neutral state. For example, at the position of "C N-2," the dog clutch between the driven gears C2 and C6 is in a meshing state. On the other hand, the driven gear C5 is in the neutral state in which it meshes with none of the driven gears C1 and C3. Accordingly, even if the first clutch CL1 is changed over at this point in time to a connected state, only the inner main shaft 7 is rotated, but there is no influence upon transmission of the rotational driving force to the countershaft 9.

Figures 7, 8:
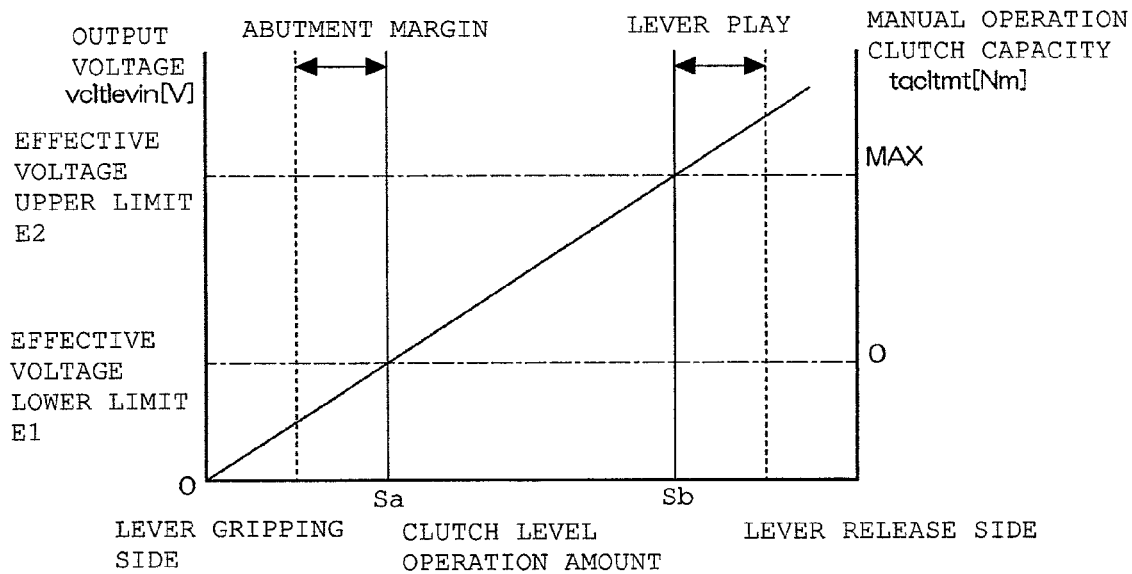
FIG. 7 is a table of shift positions defined by the shift drum.
FIG. 8 is a graph illustrating a relationship between the operational amount of a clutch lever and an output signal of a clutch operational amount sensor.

FIG. 7 illustrates a table of shift positions defined by the shift drum 30. The shift drum 30 changes the shift position by one stage, for example, from the position of N-N to the position 1-N by one shifting action. The shift drum 30 has, on both of the odd number stage side and the even number stage side, a neutral waiting position indicated by "N" between gear stages. For example, at the position "1-N," while the odd number stage side gears are in a state in which the gear for the first speed can be connected, the even number stage side gears are in a neutral state in which no driving force is transmitted. On the other hand, at any position at which no neutral waiting state is provided, such as at the position "1-2," one of the first clutch CL1 and the second clutch CL2 is connected to carry out transmission of driving force.

FIG. 8 is a graph illustrating a relationship between the operational amount of the clutch lever L and the output signal of a clutch operational amount sensor SEL. The clutch lever L (refer to FIG. 1) attached to the steering handlebar 18 is a clutch manual operation means for driving the clutch to the disconnection side in response to the operational amount by the occupant from a clutch connection state in which the clutch lever L is not operated and remains free. The clutch lever L is configured such that it returns to its initial position if it is released by the occupant.

The clutch lever operational amount sensor SEL is set such that the output voltage (vcltlevin) thereof increases in response to a release of the lever where the state in which the clutch lever L is operated fully is represented as zero. In the present embodiment, the remaining range when an amount of play of the lever which exists when the lever begins to be gripped and an abutment margin determined taking into consideration that the gripped lever is abutted to a handlebar grip formed from rubber or the like are subtracted from the output voltage is set as a range of an effective voltage.

More particularly, the amount of the lever from an operational amount Sa when the lever is released until the abutment margin comes to an end after the gripped state of the lever is established to another operational amount Sb at which the lever play amount starts is set so as to correspond to a range from a lower limit value E1 to an upper limit value E2 of the effective voltage. Then, the range from the lower limit value E1 to the upper limit value E2 is made corresponding in a proportional relationship to a range of zero to a MAX value of the manual operation clutch capacity arithmetic operation value (tqc1tmt). This can reduce the influence of a mechanical play, sensor dispersion and so forth and enhance the reliability of a clutch driving amount required by a manual operation.

Figure 9:
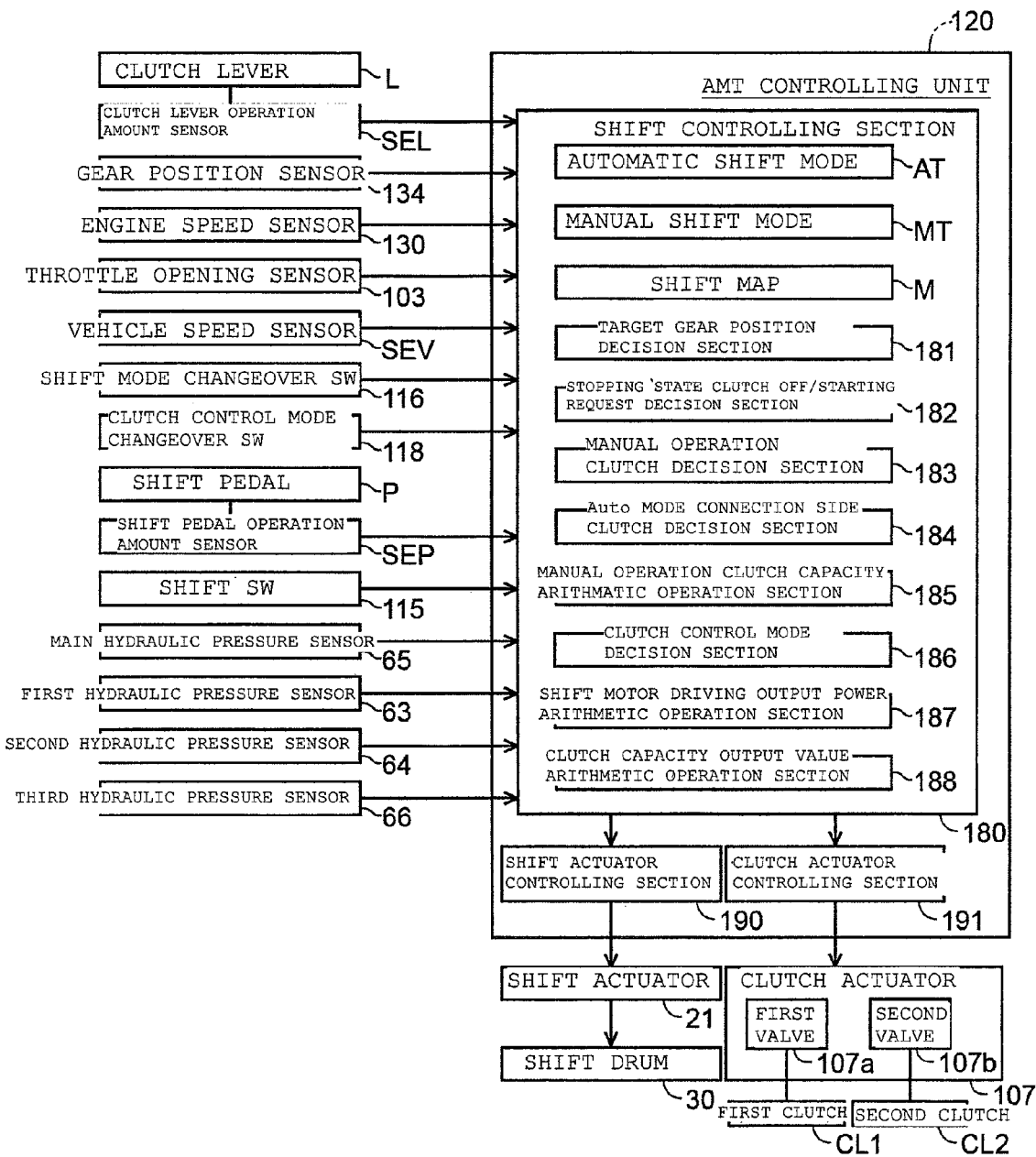
FIG. 9 is a block diagram showing a configuration of an AMT controlling unit.

FIG. 9 is a block diagram showing a configuration of the AMT controlling unit 120. Like reference characters to those used in the foregoing description denote like or equivalent portions. A shift controlling section 180 of the AMT controlling unit 120 includes an automatic shift mode AT, a manual shift mode MT, a shift map M, a target gear position decision section 181, and a stopping state clutch off/starting request decision section 182. The shift controlling section 180 further includes a manual operation clutch decision section 183, an Auto mode connection side clutch decision section 184, a manual operation clutch capacity arithmetic operational section 185, and a clutch control mode decision section 186. The shift controlling section 180 further includes a shift motor driving output power arithmetic operational section 187 and a clutch capacity output value arithmetic operational section 188.

Output signals from the clutch lever operational amount sensor SEL for detecting an operational amount of the clutch lever L, the gear position sensor 134, engine speed sensor 130, throttle opening sensor 103, vehicle speed sensor SEV, shift mode changeover SW (switch) 116 and clutch control mode changeover SW (switch) 118 are inputted to the shift controlling section 180. In addition, output signals from a shift pedal operational amount sensor SEP for detecting an operational amount of the shift pedal P, the shift SW (switch) 115, main hydraulic pressure sensor 65, first hydraulic pressure sensor 63, second hydraulic pressure sensor 64 and third hydraulic pressure sensor 66 are inputted to the shift controlling section 180.

When both of the clutch control mode and the shift mode are set to automatic control, the shift controlling section 180 transmits a driving signal to a shift actuator controlling section 190 and a clutch actuator controlling section 191 in accordance with the shift map M configured from a three-dimensional map or the like based on output signals principally from the engine speed sensor 130, throttle opening sensor 103, gear position sensor 134 and vehicle speed sensor SEV.

Meanwhile, the AMT controlling unit 120 according to the present embodiment is configured such that a manual operation for driving the twin clutch TCL and the shift drum 30 can be executed in response to an operation of the clutch lever L or an operation of the shift switch 115 or the shift pedal P as manual operation means. Among such manual operations, the operation of the manual operation means can be given priority not only when the manual mode is selected by the shift mode changeover switch 116 and the clutch control mode changeover switch 118 but also when the manual operation means is operated during automatic control. It is to be noted that the AMT controlling unit 120 carries out control also for the throttle valve motor 104 and a fuel injection system and, for example, executes also automatic blipping (racing) control for adjusting the engine speed upon shift down and like control.

Figure 10:
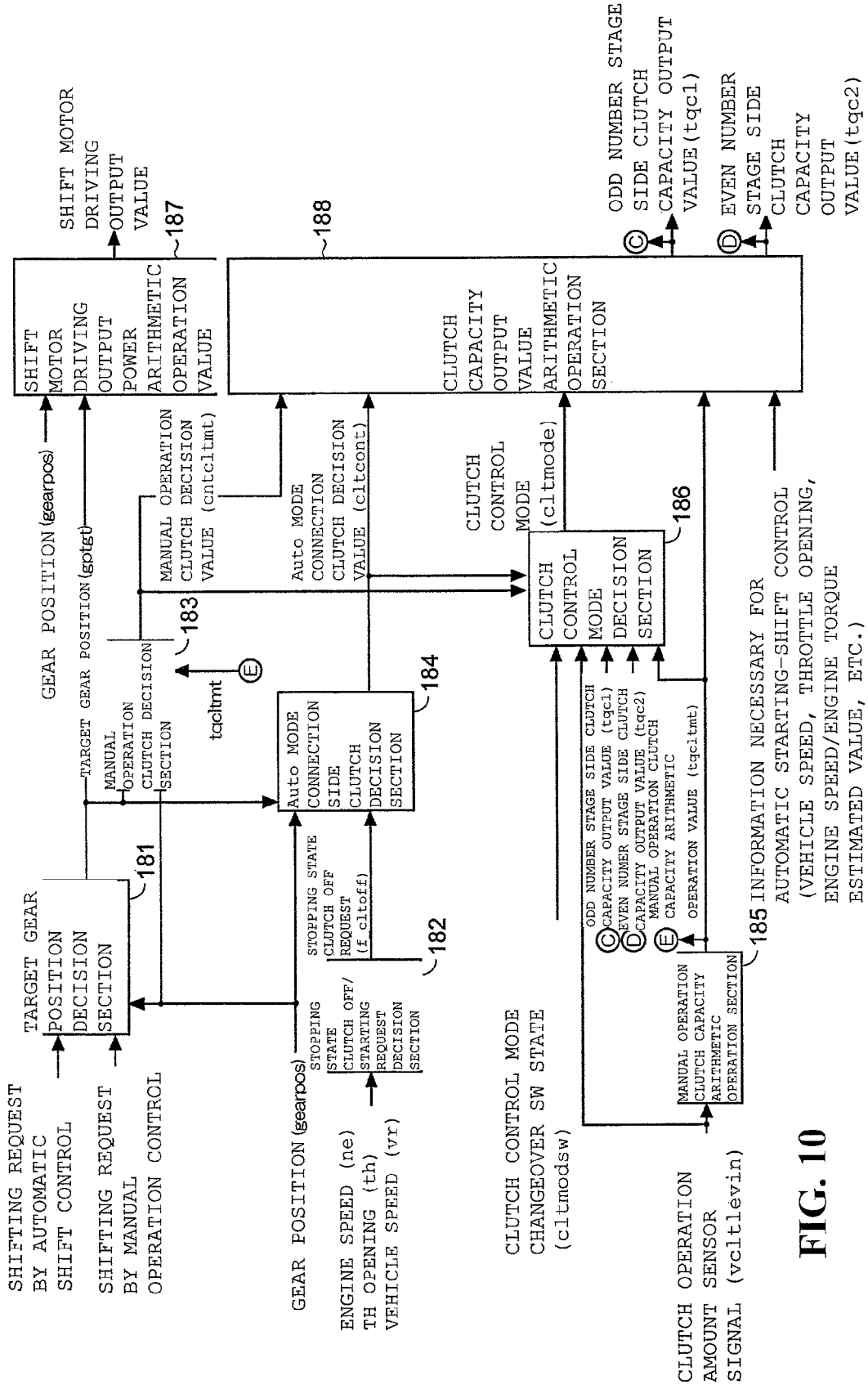
FIG. 10 is a block diagram illustrating an arithmetic operation procedure of a shift motor driving output value and a clutch capacity output value.

FIG. 10 is a block diagram illustrating an arithmetic operation procedure of a shift motor driving output value and a clutch capacity output value. Like reference characters to those used in the foregoing description denotes like or equivalent portions. The shift motor driving output value and the clutch capacity output value are arithmetically operated by the shift motor driving output power arithmetic operational section 187 and the clutch capacity output value arithmetic operational section 188, respectively, in the shift controlling section 180 and transmitted to the shift actuator controlling section 190 and the clutch actuator controlling section 191.

The shift motor driving output value for determining the rotational direction and the rotational amount of the shift drum 30 is calculated by the shift motor driving output power arithmetic operational section 187. The shift motor driving output power arithmetic operational section 187 calculates, when a difference appears between the gear position (gearpos) at present and a target gear position (gptgt), the shift motor driving output value so that the gear position at present comes to coincide with the target gear position.

The target gear position (gptgt) is derived by the target gear position decision section 181 in response to a shifting request based on the shift map M by automatic shift control and a shifting request by a manual operation (shift pedal operation or shift switch operation). Meanwhile, the gear position (gearpos) at present is detected as a 12-stage signal by the gear position sensor 134 (refer to FIG. 7).

On the other hand, the clutch capacity output value arithmetic operational section 188 arithmetically operates an odd number stage side clutch capacity output value (tqc1 ) for determining a driving amount of the odd number stage side clutch (first clutch CL1) and an even number stage side clutch capacity output value (tqc2) for determining a driving amount of the even number stage side clutch (second clutch CL2). In this instance, the clutch capacity output value arithmetic operational section 188 carries out the automatic operation based on a manual operation clutch decision value (cntcltmt), an Auto mode connection clutch decision value (cltcont), a clutch control mode (cltmode), a manual operation clutch capacity arithmetic operation value (tqc1tmt), and information necessary for automatic starting-shift control (vehicle speed, throttle opening, engine speed/engine torque estimated value and so forth).

The manual operation clutch decision value (cntcltmt) derived by the manual operation clutch decision section 183 indicates which one of the first clutch CL1 and the second clutch CL2 is to be determined as a control target in response to an operation of the clutch lever L. This is calculated based on the target gear position (gptgt), gear position (gearpos) and manual operation clutch capacity arithmetic operation value (tqc1 tme): E. The manual operation clutch capacity arithmetic operation value (tqc1tmt) is derived by the manual operation clutch capacity arithmetic operational section 185 based on the clutch operational amount sensor signal (vcltlevin) as described hereinabove with reference to FIG. 8.

The Auto mode connection clutch decision value (cltcont) derived by the Auto mode connection side clutch decision section 184 indicates which one of the first clutch CL1 and the second clutch CL2 is to be connected in the clutch Auto mode. This is derived based on the target gear position (gptgt), the gear position (gearpos) and a stopping state clutch off request (f_cltoff).

The stopping state clutch off request (f_cltoff) indicates a clutch disconnection action upon stopping of the vehicle during operation of the engine and is derived by the stopping state clutch off/starting request decision section 182 based on the engine speed Ne, throttle opening TH and vehicle speed V. The stopping state clutch off/starting request decision section 182 carries out also detection of a starting request that depends upon, for example, when the engine speed Ne reaches a predetermined value.

The clutch control mode (cltmode) derived by the clutch control mode decision section 186 indicates by which one of automatic control and manual operation the clutch is to be driven. This is derived based on a clutch control mode changeover SW state (cltmodsw) representative of an operational state of the clutch control mode changeover SW 118, a clutch operational amount sensor signal (vcltlevin), an odd number stage side clutch capacity output value (tqc1 ), an even number stage side clutch capacity output value (tqc2 ) and a manual operation clutch capacity arithmetic operation value (tqc1tmt). Accordingly, even if the Manual mode is selected by the clutch control mode changeover SW 118, the clutch control mode (clmode) may be changed to the Auto mode in response to some other parameter.

Figure 11:
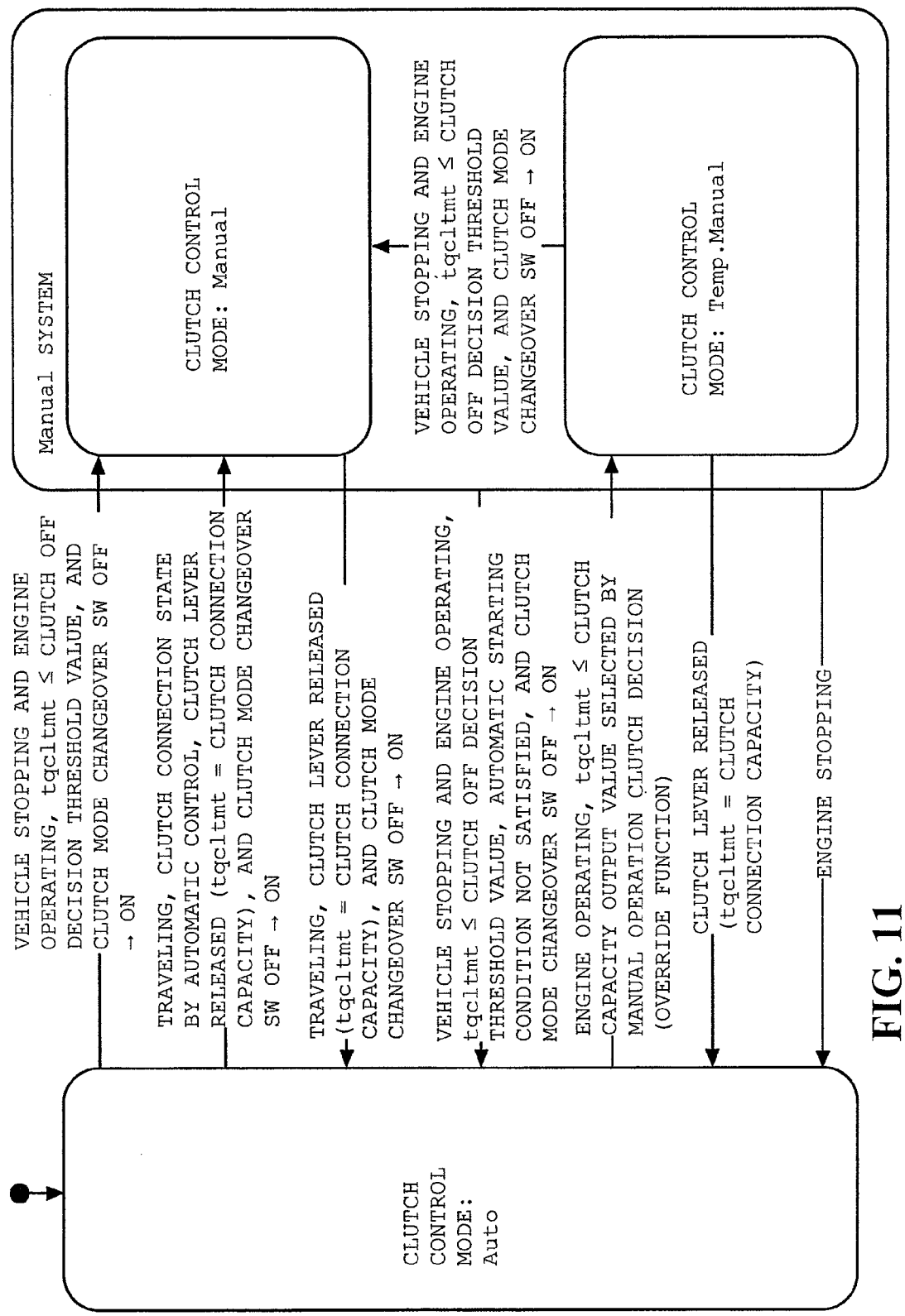
FIG. 11 is a state transition diagram illustrating a relationship among three clutch control modes.

FIG. 11 is a state transition diagram illustrating a relationship among the three clutch control modes. The three clutch control modes are an Auto mode in which an automatic control is carried out, a Manual mode in which a manual operation is carried out, and a Temp. Manual mode (hereinafter referred to sometimes as Temp. mode) in which a temporary manual operation is carried out.

The Auto mode is a mode in which a clutch capacity suitable for an operating state is arithmetically operated to control the clutch by automatic starting-shift control. Meanwhile, the Manual mode is a mode in which a clutch capacity is arithmetically operated in response to a clutch operation instruction by the occupant to control the clutch. The Temp. mode is a temporary manual operation mode in which a clutch operation instruction from the occupant is accepted in the Auto mode and a clutch capacity is arithmetically operated from the clutch operation instruction to control the clutch. It is to be noted that, if the occupant stops the operation of the clutch lever L (fully releases the clutch lever) in the Temp. mode, then the clutch control mode returns to the Auto mode.

It is to be noted that the twin clutch type transmission according to the present embodiment has a structure that a pump is driven by rotational driving force of the engine to generate clutch controlling hydraulic pressure. Therefore, upon the starting of the system, it is necessary for the twin clutch type transmission to carry out the starting in a clutch off state (disconnected state) in the Auto mode. Similarly, also upon stopping of the engine, since no clutch operation is required, it is set that a clutch off state is restored in the Auto mode.

First, if, in the Auto mode, conditions "that the vehicle is in a stopping state, that the engine is in an operating state, that the manual operation clutch capacity arithmetic operation value (tqc1tmt) is equal to or lower than a clutch off decision threshold value and that the clutch control mode changeover SW changes from an off state to an on state (a depression operation is carried out)" are satisfied, then the clutch control mode transits to the Manual mode.

Further, if, in the Auto mode, conditions "that the vehicle is being operated, that the clutch is in a connected state by the automatic control, that the clutch lever L is released (the manual operation clutch capacity arithmetic operation value (tqc1tmt) is equal to the clutch connection capacity) and that the clutch control mode changeover SW changes from an off state to an on state" are satisfied, then the clutch control mode transits to the Manual mode.

In contrast, if, in the Manual mode, conditions "that the vehicle is being operated, that the clutch lever L is in a released state (tqc1tmt is equal to the clutch connection capacity) and that the clutch control mode changeover SW changes from an off state to an on state" are satisfied, then the clutch control mode transits to the Auto mode.

Further, if, in a Manual type mode (Manual mode or Temp. mode), conditions "that the vehicle is in a stopping state, that the engine is in an operating state, that the manual operation clutch capacity arithmetic operation value (tqc1tmt) is equal to or lower than the clutch off decision threshold value, that the automatic starting conditions are not satisfied and that the clutch mode changeover SW changes from an off state to an on state" are satisfied, then the clutch control mode transits to the Auto mode.

Furthermore, if, in the Auto mode, conditions "that the engine is in an operating state and that the manual operation clutch capacity arithmetic operation value (tqc1tmt) calculated from the clutch operational amount sensor signal is equal to or lower than a clutch capacity output value (tqc1, tqc2 )" are satisfied, then the clutch control mode transits to the Temp. Manual mode. Consequently, a so-called override function of causing the clutch control mode to smoothly transit to the Temp. mode if the occupant carries out a clutch operation while the vehicle is operating in the auto mode can be implemented.

On the other hand, if, in the Temp. Manual mode, a condition "that the clutch lever L is in a released state (tqc1tmt is equal to the clutch connection capacity)" is satisfied, then the clutch control mode transits to the Manual mode.

Further, if, in the Temp. Manual mode, conditions "that the vehicle is in a stopping state, that the engine is in an operating state, that the manual operation clutch capacity arithmetic operation value (tqc1tmt) is equal to or lower than the clutch off decision threshold value and that the clutch mode changeover SW changes from an off state to an on state" are satisfied, then the clutch control mode transits to the Manual mode.

Then, if, in a Manual type mode (Manual mode or Temp. mode), a condition "that the engine is stopping" is satisfied, then the clutch control mode transits to the Manual mode.

Figure 12:
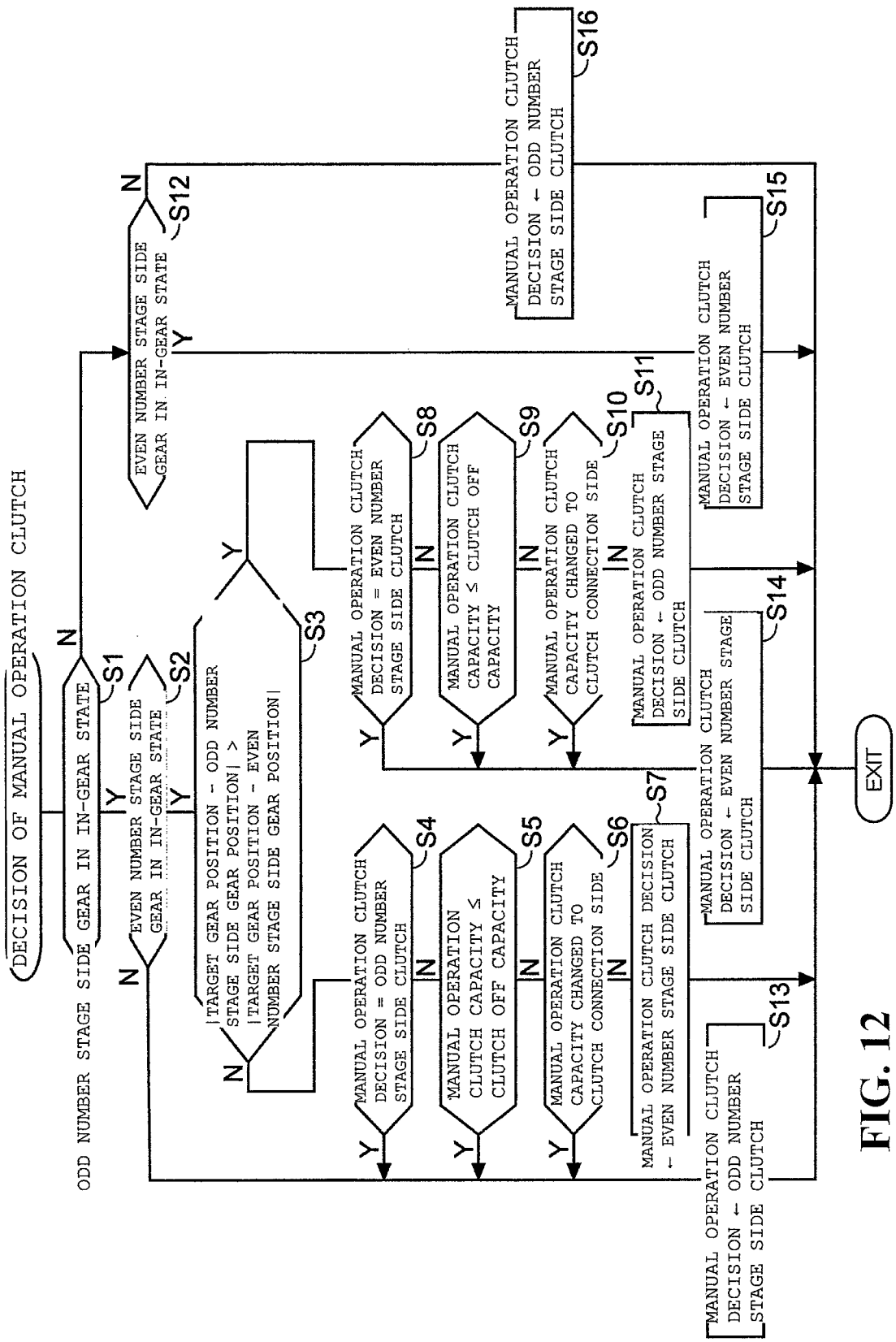
FIG. 12 is a flow chart illustrating a procedure for deciding a clutch for which a manual operation is to be executed.

FIG. 12 is a flow chart illustrating a procedure for deciding a clutch which is to execute a manual operation. This decision executed by the manual operation clutch decision section 183 decides, when the clutch lever L is operated, which one of the first clutch CL1 and the second clutch CL2 is to correspond to the operation based on the gear position at present and the target gear position.

At step S1, it is decided whether or not an odd number stage side gear is in an in-gear state (not in a neutral state). If an affirmative decision is made at step S1, then the processing advances to step S2, at which it is decided whether or not an even number stage side gear is in an in-gear state. If an affirmative decision is made at step S2, then the processing advances to step S3.

At step S3, it is decided whether or not the value of the |target gear position−odd number stage side gear position| is higher than the |target gear position−even number stage side gear position|. In this instance, if both of an odd number stage side gear and an even number stage side gear are in an in-gear state, for example, the gear position is "3-4" and the target gear position is the fifth gear, then |5−3|>|5−4| is satisfied and the decision at step S3 becomes an affirmative decision. If this inequality is not satisfied, then a negative decision is made at step S3.

If a negative decision is made at step S3, then the processing advances to step S4, at which it is decided whether or not the manual operation clutch decision is the odd number stage side clutch. If a negative decision is made at step S4, then the processing advances to step S5. At step S5, it is decided whether or not the manual operation clutch capacity is equal to or smaller than the clutch off capacity, and if a negative decision is made, then the processing advances to step S6. At step S6, it is decided whether or not the manual operation clutch capacity has changed to the clutch connection side, and if a negative decision is made, then the processing advances to step S7. At step S7, the manual operation clutch decision is set to the even number stage side clutch, thereby ending the series of control steps.

In contrast, if an affirmative decision is made at step S4, S5 or S6, then the processing advances to step S13, at which the manual operation clutch decision is set to the odd number stage side clutch, thereby ending the series of control steps.

Meanwhile, if an affirmative decision is made at step S3, then the processing advances to step S8, at which it is decided whether or not the manual operation clutch decision is the even number stage side clutch. Then, if a negative decision is made, then the processing advances to step S9. At step S9, it is decided whether or not the manual operation clutch capacity is equal to or smaller than the clutch off capacity, and if a negative decision is made, then the processing advances to step S10. At step S10, it is decided whether or not the manual operation clutch capacity has changed to the clutch connection side, and if a negative decision is made, then the processing advances to step S11. At step S11, the manual operation clutch decision is set to the odd number stage side clutch, thereby ending the series of control steps.

In contrast, if an affirmative decision is made at step S8, S9 or S10, then the processing advances to step S14, at which the manual operation clutch decision is set to the even number stage side clutch, thereby ending the series of control steps.

Returning to the decision at step S1, if a negative decision is made at step S1, namely, if it is decided that an odd number stage side gear is in a neutral state, then the processing advances to step S12, at which it is decided whether or not an even number stage side gear is in an in-gear state. If a negative decision is made at step S12, namely, if the gear position is "N-N," then the manual operation clutch decision is set to the odd number stage side clutch at step S16 (because the position "1-N" only exists as a next position to the position "N-N"), thereby ending the series of control steps.

On the hand, if an affirmative decision is made at step S12, namely, if it is decided that only an even number stage side gear is in an in-gear state (position "N-2," "N-4" or "N-6"), then the manual operation clutch decision is set to the even number stage side clutch at step S15, thereby ending the series of control steps.

Further, returning to the decision at step S2, if a negative decision is made at step S2, namely, if an even number stage side gear is in a neutral state and only an odd number stage side gear is in an in-gear state (position "1-N," "3-N" or "5-N"), then the processing advances to step S13. At step S13, the manual operation clutch decision is set to the odd number stage side clutch, thereby ending the series of control steps.

Figure 13:
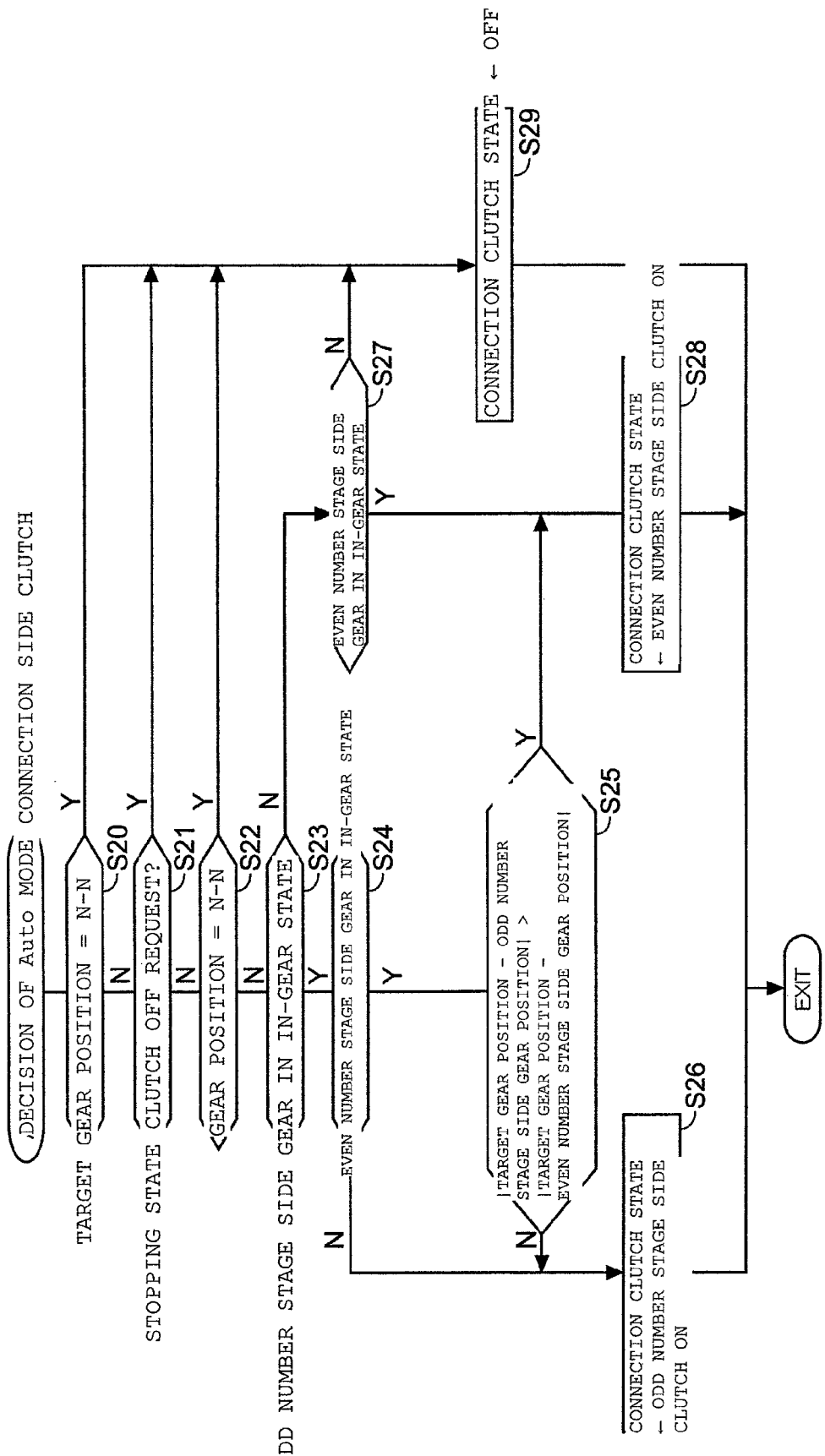
FIG. 13 is a flow chart illustrating a procedure for deciding an Auto mode connection side clutch.

FIG. 13 is a flow chart illustrating a procedure for deciding a connection side clutch in the Auto mode. This decision is executed by the Auto mode connection side clutch decision section 184 and is made in accordance with the gear position at present and the target gear position which one of the first clutch CL1 and the second clutch CL2 is to be connected by automatic control during operation wherein the clutch control mode is the Auto mode.

At step S20, it is decided whether or not the target gear position is the position "N-N," and if a negative decision is made, then the processing advances to step S21. At step S21, it is decided whether or not there is a stopping state clutch off request, and if a negative decision is made, then the processing advances to step S22. At step S22, it is decided whether or not the gear position at present is "N-N," and if a negative decision is made, then the processing advances to step S23.

At step S23, it is decided whether or not an odd number stage side gear is in an in-gear state, and if an affirmative decision is made, then the processing advances to step S24. At step S24, it is decided whether or not an even number stage side gear is an in-gear state, and if an affirmative decision is made, namely, if both of an odd number stage side gear and an even number stage side gear are in an in-gear state, then the processing advances to step S25.

At step S25, it is decided whether or not the value of the |target gear position−odd number stage side gear position| is greater than the |target gear position−even number stage side gear position|. If a negative decision is made at step S25, then the processing advances to step S26, at which the connection clutch state is set to the odd number stage side clutch on, thereby ending the series of control steps. In contrast, if an affirmative decision is made at step S25, then the processing advances to step S28, at which the connection clutch state is set to the even number stage side clutch on, thereby ending the series of control steps.

Returning to the decision at step S20, if an affirmative decision is made at step S20, S21 or S22, then the processing advances to step S29, at which it is determined that no clutch connection is required and the connection clutch state is set to off, thereby ending the series of control steps.

In contrast, if a negative decision is made at step S23, then the processing advances to step S27, at which it is decided whether or not an even number stage side gear is in an in-gear state. If an affirmative decision is made at step S27, namely, if it is decided that an odd number stage side gear is in a neutral state and only an even number stage side gear is in an in-gear state ("N-2," "N-4" or "N-6"), then the processing advances to step S28. At step S28, the connection clutch state is set to the even number stage side clutch on, thereby ending the series of control steps.

It is to be noted that, if a negative decision is made at step S27, namely, if it is decided that none of the odd number stage side gear and the even number stage side gear is in an in-gear state, then the processing advances to step S29, at which the connection clutch state is set to an off state, thereby ending the series of control steps. In contrast, if a negative decision is made at step S24, then the processing advances to step S26, at which the connection clutch state is set to the odd number stage side clutch on, thereby ending the series of control steps.

Figure 14:
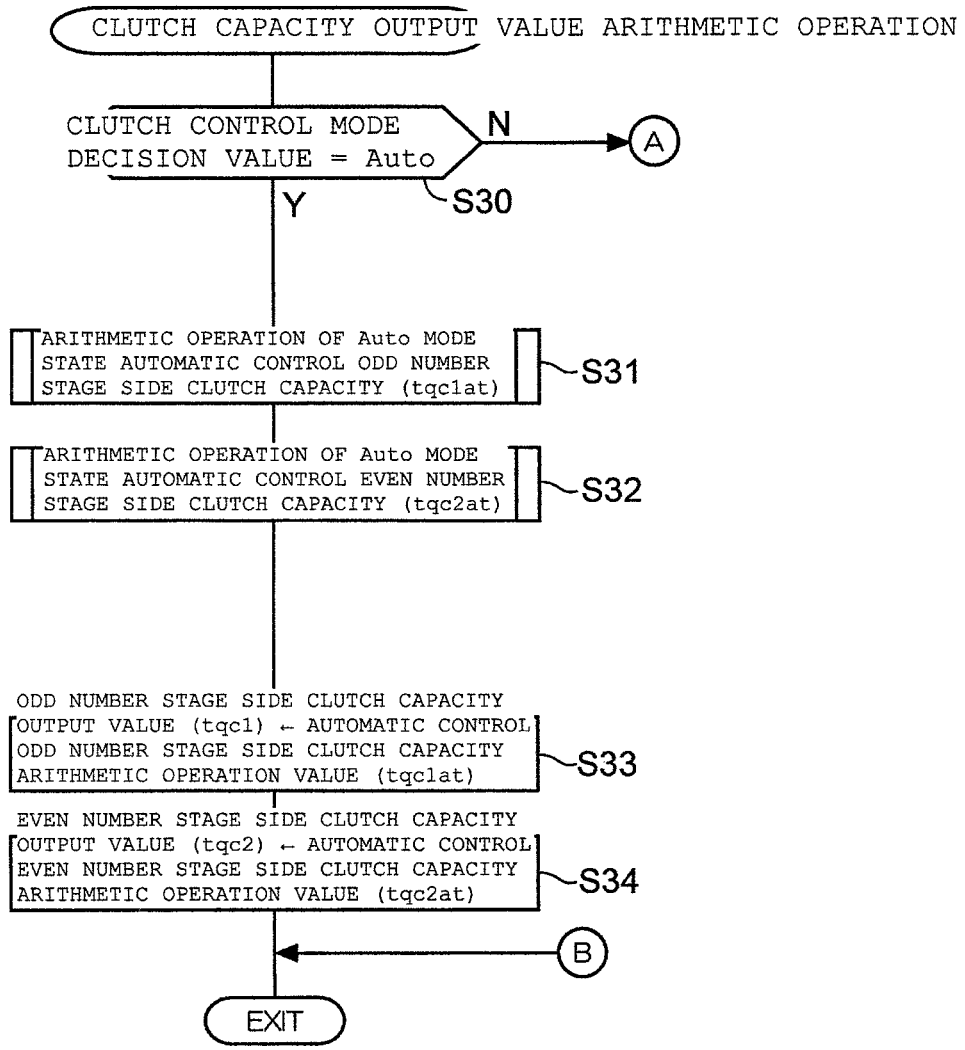
FIG. 14 is a flow chart (1/2) illustrating a procedure of a clutch capacity output value arithmetic operation.
Figure 15:
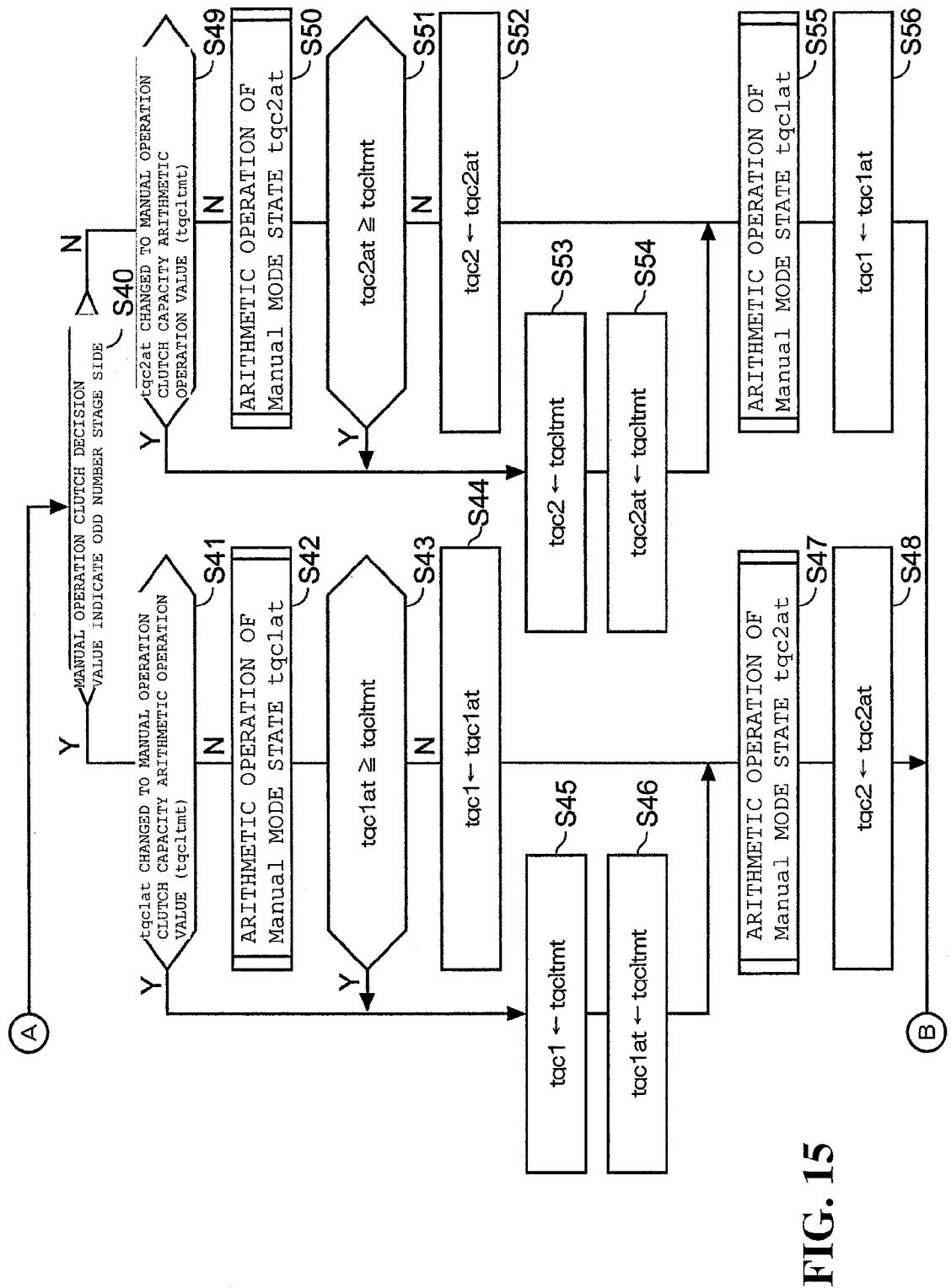
FIG. 15 is a flow chart (2/2) illustrating the procedure of the clutch capacity output value arithmetic operation.

FIGS. 14 and 15 are flow charts (1/2) and (2/2) illustrating a procedure for a clutch capacity output value arithmetic operation. At step S30, it is decided whether or not the clutch control mode decision value indicates the Auto mode, and if an affirmative decision is made, then the processing advances to step S31. However, if a negative decision is made at step S30, then the processing advances to A (refer to FIG. 15).

At step S31, arithmetic operation of an Auto mode state automatic control odd number stage side clutch capacity (tqc1 at) is executed, and then at next step S32, arithmetic operation of Auto mode state automatic control even number stage side clutch capacity (tqc2 at) is executed. At steps S31 and S32, arithmetic operation is executed so that starting/shifting is carried out smoothly in accordance with the shift map M configured from a three-dimensional map or the like based principally on output signals of the engine speed sensor 130, throttle opening sensor 103, gear position sensor 134 and vehicle speed sensor SEV.

Then at step S33, the odd number stage side clutch capacity output value (tqc1) is set to the automatic control odd number stage side clutch capacity (tqc1 at), and then at step S34, the even number stage side clutch capacity output value (tqc2) is set to the automatic control even number stage side clutch capacity (tqc2 at), thereby ending the series of control steps.

Meanwhile, if a negative decision is made at step S30, namely, if the clutch control mode decision value indicates the Manual mode or the Temp. mode, then the processing advances to step S40 following A.

Referring to FIG. 15, at step S40, it is decided whether or not the manual operation clutch decision value is the odd number stage side clutch. If an affirmative decision is made at step S40, then the processing advances to step S41, at which it is decided whether or not the automatic control odd number stage side clutch capacity (tqc1 at) has been changed to the manual operation clutch capacity arithmetic operation value (tqc1tmt) already. If a negative decision is made at step S41, then the processing advances to step S42, at which Manual mode state tqc1 at arithmetic operation is executed. At step S42, when the automatic control clutch capacity arithmetic operation value is changed to the manual operation clutch capacity, an arithmetic operation of tqc1 at is executed so that the influence upon the vehicle body behavior may be minimized together with the even number stage side clutch capacity.

At step S43, it is decided whether or not tqc1 at is equal to or higher than tqc1tmt. If a negative decision is made at step S43, then the processing advances to step S44, at which tqc1 is set to tqc1 at.

If an affirmative decision is made at step S41 or S43, then the processing advances to step S45, at which tqc1 is set to tqc1tmt, and then at next step S46, the tqc1 at is set to tqc1 mt. Thereafter, the processing advances to step S47.

At step S47, the Manual mode state tqc2 at arithmetic operation is executed. At step S47, basically the clutch capacity is set to a value equal to or smaller than a predetermined value (in the present embodiment, zero), and if the clutch capacity is equal to or greater than the predetermined value, then the clutch capacity arithmetic operation value is changed to the predetermined value. At this time, the arithmetic operation is executed so that the influence on the vehicle body behavior may be minimized together with the odd number stage side clutch capacity. Then, after tqc2 is set to tqc2 at at step S48, the processing returns to B, thereby ending the series of control steps.

Returning to the decision at step S40, if a negative decision is made at step S40, then arithmetic operation similar to those at steps S41 to S48 described hereinabove is started in order beginning with the even number stage side clutch.

More particularly, if a negative decision is made at step S40, then the processing advances to step S49, at which it is decided whether or not the automatic control even number stage side clutch capacity (tqc2 at) has changed to the manual operation clutch capacity arithmetic operation value (tqc1tmt). If a negative decision is made at step S49, then the processing advances to step S50, at which Manual mode state tqc2 at arithmetic operation is executed.

Then at step S51, it is decided whether or not tqc2 at≥tqc1tmt is satisfied. If a negative decision is made at step S51, then the processing advances to step S52, at which tqc2 is set to tqc2 at.

If an affirmative decision is made at step S49 or S51, then the processing advances to step S53, at which tqc2 is set to tqc1tmt, and then at step S54, tqc2 at is set to tqc1tmt. Thereafter, the processing advances to step S55.

At step S55, Manual mode state tqc1 at arithmetic operation is carried out. Then, tqc1 is set to tqc1 at at step S56, and then the processing advances to B.

In the following, a flow of clutch control in various settings is described with reference to a time chart. The time charts illustrated in FIGS. 16 and 17 include, in an upper half thereof, a table including a total of ten parameters and, in a lower half thereof, three graphs corresponding to the table.

The parameter table is configured from items of (a) to (j) give below.
(a) Target gear position (gptgt)=one of N, 1, 2, 3, 4, 5 and 6
(b) Gear position at present (gearpos)=one of N-N, 1-N, 1-2, N-2, 3-2, 3-N, 3-4, N-4, 5 -4, 5-N, 5-6 and N-6
(c) Gear shift state=one of STOP (shift drum stopping), UP (shift up side feeding action proceeding) and DOWN (shift down action proceeding)
(d) Gear shift control mode (sftmode)=one of Auto (AT shift mode) and Manual (MT shift mode)
(e) Clutch control mode changeover SW (clmodsw)=ON or OFF (the switch is on only while the switch is depressed and indicates a changeover will to the clutch Manual mode)
(f) Clutch control mode (cltmode)=one of Auto mode, Temp. Manual mode and Manual mode
(g) Auto mode connection side clutch decision value (cltcont) =on/off of odd number stage side clutch or on/off of even number stage side clutch
(h) Manual operation clutch decision value (cntcltmt)=odd number stage side clutch or even number stage side clutch
(i) Odd number stage side clutch capacity output (tqc1)=tqc1 at or tqc1tmt
(j) Even number stage side clutch capacity output (tqc2)=tqc2 at or tqc1tmt Meanwhile, the three graphs in the lower half of the time chart indicate the clutch operational amount sensor signal (vcltlevin) and clutch capacity, throttle opening, and engine speed and vehicle speed. In the graph of the clutch capacity sensor, the capacity output (tqc1 ) of the first clutch CL1 is indicated by a thick line formed from slanting lines, and the capacity output (tqc2) of the second clutch CL2 is indicated by a thick line formed from drawing dots. Meanwhile, the clutch operational amount sensor signal (vcltlevin) is indicated by an alternate long and short dashed line, and the manual operation clutch decision value (cntcltmt) is indicated by an alternate long and two short dashed line. Further, a numeral in a round mark in the time chart is represented, in the following description, by the numeral in parentheses like (1), (2) or (3).

Figure 16:
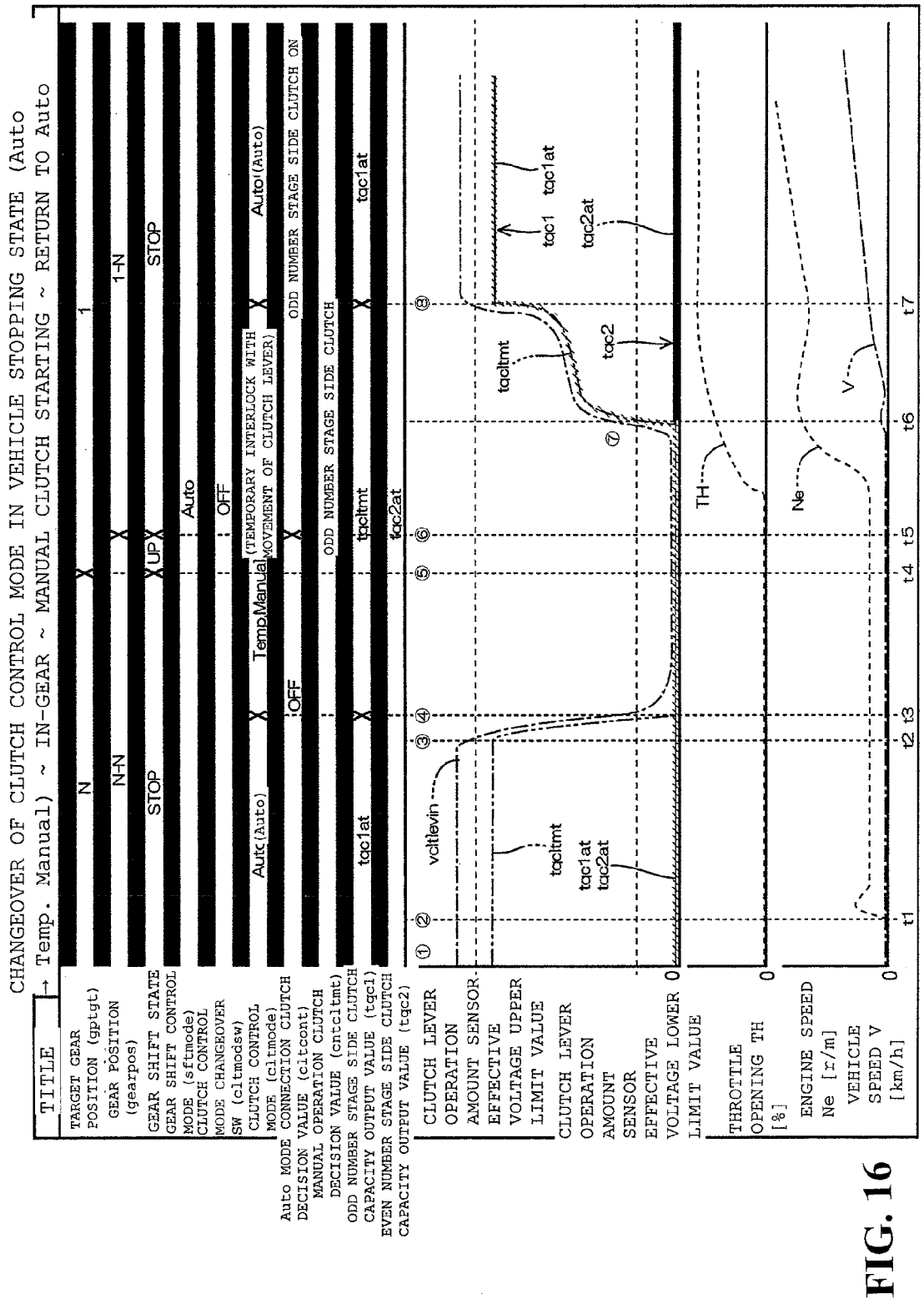
FIG. 16 is a time chart (1) illustrating a flow of clutch control mode changeover in a vehicle stopping state.

FIG. 16 is a time chart illustrating a flow of clutch control mode changeover in a vehicle stopping state. This time chart corresponds to a flow until, from a stopping state in which both of the gear shift control mode and the clutch control mode are the auto modes, only the clutch control mode transits to the Temp. Manual mode in response to gripping of the clutch lever L by the occupant and the vehicle starts at the first speed in response to a release operation of the occupant.

First, at (1), the ignition switch is switched on to start up the system, and then at time t1 corresponding to (2), the engine is started. At this time, the gear position is N-N, the clutch control mode is Auto, the odd number stage clutch capacity output (tqc1 ) is tqc1 at, and the first clutch CL1 is in a disconnected state.

Then at time t2 corresponding to (3), the clutch operational amount sensor signal (vcltlevin) becomes lower than the sensor effective voltage upper limit value in response to the gripping operation of the clutch lever L, and thereupon, the manual operation clutch capacity arithmetic operation value (tqc1tmt) begins to decrease in an interlocking relationship with the movement of the clutch lever L. Then, when vcltlevin becomes lower than the sensor effective voltage lower limit value at time t3 corresponding to (4), the clutch control mode changes over to the Temp. Manual mode and the odd number stage clutch capacity output (tqc1) changes over to tqc1tmt. In particular, driving of the first clutch CL1 in response to the lever operation of the occupant is started (override function).

In other words, at a point in time at which tqc1tmt≤tqc1 at (tqc2 at) becomes satisfied, the clutch control mode becomes the Temp. mode. At this time, since the gear position is N-N, the manual operation clutch decision value is the odd number stage side clutch, and the odd number stage clutch capacity output (tqc1) is changed over to the manual operation clutch capacity arithmetic operation value (tqc1tmt). The automatic control odd number stage side clutch capacity arithmetic operation value (tqc1 at) is also overwritten with the manual operation clutch capacity arithmetic operation value (tqc1tmt). At this time, the even number stage clutch capacity output (tqc2 ) is set to the automatic control even number stage clutch capacity arithmetic operation value (tqc2 at).

Then at time t4 corresponding to (5), a shift UP action is executed in response to a shift UP request of the occupant by an operation of the shift switch or the shift pedal. This shift UP request is permitted to execute because acceptance of the shift switch or shift pedal operation is permitted as a result of transition of the clutch control mode to the Temp. mode. Further, at time t5 corresponding to (6), the gear position at present is "1 -N" as a result of the shift UP action and the Auto mode connection side clutch decision value changes to the odd number stage side clutch on.

Within a range corresponding to (7), the odd number stage clutch capacity output (tqc1 ) is the manual operation clutch capacity arithmetic operation value (tqc1tmt), and the first clutch CL1 is controlled in response to the operation of the clutch lever L. Then, in order to start the vehicle, the occupant increases the throttle opening TH to raise the engine speed Ne while a half clutch operation is carried out.

At time t7 corresponding to (8), the half clutch operation upon starting comes to an end, and the clutch control mode returns from the Temp. mode to the Auto mode in response to a full release of the clutch lever L. Consequently, the odd number stage clutch capacity output (tqc1) outputs the automatic control odd number stage side clutch capacity arithmetic operation value (tqc1 at). In particular, the odd number stage clutch capacity output (tqc1 ) applies the manual operation clutch capacity arithmetic operation value (tqc1tmt) only within a period from time t3 to time t8. Since, during the manual control, the automatic control odd number stage side clutch capacity arithmetic operation value (tqc1 at) is the manual operation clutch capacity arithmetic operation value (tqc1tmt), even if the clutch control mode changes over to the Auto mode, the clutch capacity output does not vary suddenly and no sense of discomfort is provided to the occupant.

Figure 17:
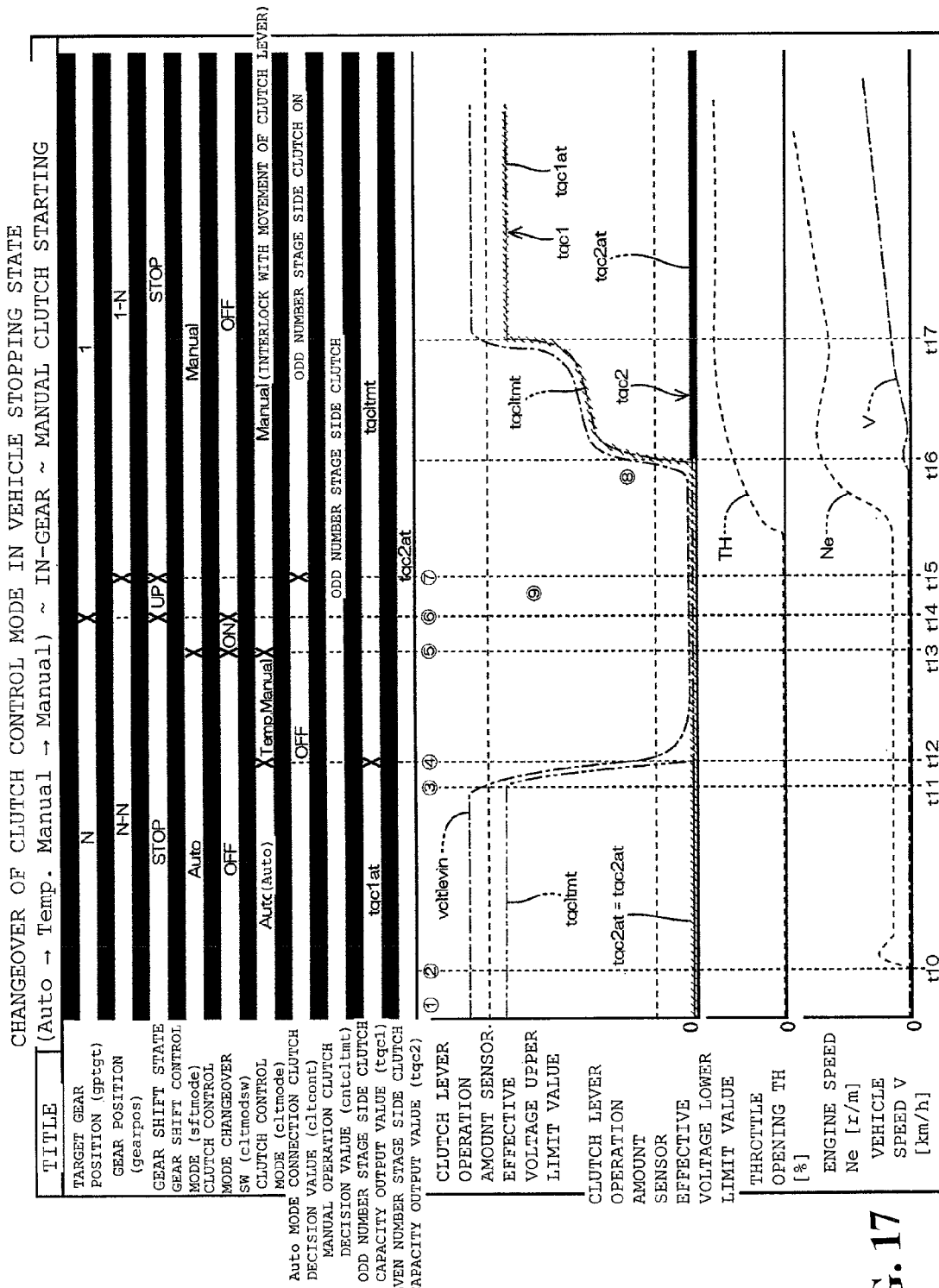
FIG. 17 is a time chart (2) illustrating a flow of clutch control mode changeover in a vehicle stopping state.

FIG. 17 is a time chart illustrating a flow of the clutch control mode changeover in a vehicle stopping state. Also this time chart corresponds, similarly to FIG. 16, to a flow until, from a stopping state in which both of the gear shift control mode and the clutch control mode are the auto modes, only the clutch control mode transits to the Temp. Manual mode in response to gripping of the clutch lever L by the occupant and the vehicle starts at the first speed in response to a release operation of the occupant. However, the time chart of FIG. 17 is different from the time chart of FIG. 16 in that the clutch control mode changeover switch is operated in the Temp. mode.

First, the ignition switch is switched on to start the system at (1), and then at time t10 corresponding to (2), the engine is started. At this time, the gear position is N-N, the clutch control mode is Auto, the odd number stage clutch capacity output (tqc1) is tqc1 at, and the first clutch CL1 is in a disconnected state.

Then at time t11 corresponding to (3), the clutch operational amount sensor signal (vcltlevin) becomes lower than the sensor effective voltage upper limit value in response to a gripping operation of the clutch lever L, and thereupon, the manual operation clutch capacity arithmetic operation value (tqc1tmt) begins to decrease in an interlocking relationship with the movement of the clutch lever L. Then at time t12 corresponding to (4), vcltlevin becomes lower than the sensor effective voltage lower limit value. Thereupon, the clutch control mode changes over to the Temp. Manual mode and the odd number stage clutch capacity output (tqc1) changes over to tqc1tmt. In other words, driving of the first clutch CL1 in response to the lever operation of the occupant is started.

Then, at time t13 corresponding to (5), the clutch control mode SW is operated, and consequently, the clutch control mode changes over from the Temp. mode to the Manual mode. More particularly, when, in the state in which the clutch lever L is gripped and the clutch control mode is the Temp. mode, the manual operation clutch capacity arithmetic operation value (tqc1tmt) is equal to or lower than the predetermined value and the clutch control mode SW is switched on (an on signal is originated only while the occupant pushes the clutch control mode SW), the clutch control mode changes over to the Manual mode and simultaneously also the gear shift control mode changes over to the MT shift mode. This is because a manual operation of the clutch and automatic control of the shift drum cannot be combined.

Then at time t14 corresponding to (6), a shift UP process is executed in response to a shift UP request of the occupant. Further, at time t15 corresponding to (7), the gear position at present is "1-N" as a result of the shift UP process, and the Auto mode connection side clutch decision value becomes the odd number stage clutch on.

Within a range corresponding to (8), the odd number stage clutch capacity output (tqc1) is the manual operation clutch capacity arithmetic operation value (tqc1tmt), and the first clutch CL1 is manually operated. While the throttle opening TH is increased to raise the engine speed Ne, connection of the first clutch CL1 is started at time t16 in response to an operation of the clutch lever L and the vehicle starts in a half clutch action state. At time t17, the clutch lever L is released fully. However, the clutch control mode maintains the Manual mode while traveling of the vehicle continues. In other words, the state in which the odd number stage clutch capacity output (tqc1) applies the manual operation clutch capacity arithmetic operation value (tqc1tmt) at time t12 continues also after time t17.

As described above, with the twin clutch controlling apparatus according to the present invention, it includes the manual operation clutch decision section 183 which decides with the clutch capacity (tqc1, tqc2) of which one of the first clutch CL1 or the second clutch CL2 the manual operation clutch capacity arithmetic operation value (tqc1tmt) calculated by converting the operational amount of the clutch lever L into an electric signal is to be interlocked. Therefore, it is possible to easily determine a clutch to be made a target of a manual operation, and by interlocking an operation of the clutch manual operation means such as a clutch lever rapidly with the odd number stage side clutch or the even number stage side clutch. Thus, a sense of togetherness between the manual operation and the actual action of the clutch can be enhanced.

It is to be noted that the shape and the structure of the twin clutch, multi-speed transmission and engine, the configuration of the control apparatus, the configuration of the manual operation means for the clutch and so forth are not limited to those of the embodiment described above, but various alterations are possible. The twin clutch controlling apparatus according to the present invention can be applied not only to a motorcycle but also to various vehicles such as three/four-wheeled vehicles of the saddle type and so forth.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims

What is claimed is:

1. A twin clutch controlling apparatus comprising:
a multi-speed transmission having a plurality of gear trains between a main shaft on the input side and a countershaft on the output side, said main shaft including an inner main shaft and an outer main shaft being coaxial relative to each other;
a shift actuator for carrying out a changeover of a shift stage of the multi-speed transmission;
a twin clutch configured from an odd number stage side clutch and an even number stage side clutch for connecting and disconnecting power transmission between the transmission and an engine, said twin clutch including a first clutch attached against rotation on the inner main shaft for supporting odd number stage side gears and a second clutch attached to the outer main shaft for supporting even number stage side gears, said first clutch and said second clutch being juxapositioned relative to each other on one side of the multi-speed transmission;
a clutch actuator for controlling the twin clutch; and
a manual operation clutch capacity arithmetic operation section for converting an operational amount of a clutch manual operation means to arithmetically operate a manual operation clutch capacity arithmetic operation value (tqc1tmt) corresponding to the manual operation, the twin clutch controlling apparatus comprising:
a manual operation clutch decision section for determining with a clutch capacity (tqc1, tqc2) of which one of the odd number stage side clutch or the even number stage side clutch the manual operation clutch capacity arithmetic operational value (tqc1tmt) is to be interlocked;

wherein the decision by the manual operation clutch decision section is executed at least based on a target gear position (gptgt) and a gear position (gearpos) at present;

wherein the gear position (gearpos) at present includes a neutral position at which none of the even number stage side gears and the odd number stage side gears of the multi-speed transmission is in an in-gear state, and when the gear position (gearpos) at present is the neutral position, the manual operation clutch decision section carries out a decision to interlock the manual operation clutch capacity arithmetic operation value (tqc1tmt) with an odd number stage side clutch capacity (tqc1).

2. The twin clutch controlling apparatus according to claim 1, wherein the gear position (gearpos) at present includes a position at which both of an even number stage side gear and an odd number stage side gear of the multi-speed transmission exhibit an in-gear state and a position at which only one of the odd number stage side gears or the even number stage side gears exhibits an in-gear state, and the manual operation clutch decision section carries out, when the gear position (gearpos) at present is the position at which one of the odd number stage side gears or the even number stage side gears exhibits an in-gear state, a decision to interlock the manual operation clutch capacity arithmetic operation value (tqc1tmt) with the clutch capacity (tqc1, tqc2) on the side on which the in-gear state is exhibited.

3. The twin clutch controlling apparatus according to claim 2, wherein the manual operation clutch decision section determines, where the gear position (gearpos) at present is a position at which both of the even number stage side gear and the odd number stage side gear are in an in-gear state, that one of the clutches which is positioned nearer to the target gear position (gptgt) as a selection candidate, carries out, when the clutch determined as the selection candidate and a currently decided clutch coincide with each other, a decision to interlock the manual operation clutch capacity arithmetic operation value (tqc1tmt) with the clutch capacity (tqc1, tqc2) of the selection candidate, and in contrast, carries out, when the clutch determined as the selection candidate and the currently decided clutch do not coincide with each other, a decision to interlock the manual operation clutch capacity arithmetic operation value (tqc1tmt) with that one of the clutches which is positioned nearer to the target gear position (gptgt) at a point in time at which the manual operation clutch capacity arithmetic operation value (tqc1tmt) becomes equal to or lower than a predetermined value or at another point in time at which the manual operation clutch capacity arithmetic operation value (tqc1tmt) changes in a connection direction.

4. A twin clutch controlling apparatus comprising:

a multi-speed transmission having a plurality of gear trains between a main shaft on the input side and a countershaft on the output side, said main shaft including an inner main shaft and an outer main shaft coaxially arranged relative to each other;

a shift actuator for carrying out a changeover of a shift stage of the multi-speed transmission;

a twin clutch configured from an odd number stage side clutch and an even number stage side clutch for connecting and disconnecting power transmission, said twin clutch including a first clutch attached against rotation on the inner main shaft for supporting odd number stage side gears and a second clutch attached to the outer main shaft for supporting even number stage side gears, said first clutch and said second clutch being juxtapositioned relative to each other on one side of the multi-speed transmission;

a clutch actuator operatively connected for controlling the twin clutch;

a manual operation clutch capacity arithmetic operation section for converting an operational amount of a clutch manual operation means to arithmetically operate a manual operation clutch capacity arithmetic operation value (tqc1tmt) corresponding to the manual operation; and a manual operation clutch decision section for determining with a clutch capacity (tqc1, tqc2) of which one of the odd number stage side clutch or the even number stage side clutch the manual operation clutch capacity arithmetic operational value (tqc1tmt) is to be interlocked;

wherein the decision by the manual operation clutch decision section is executed at least based on a target gear position (gptgt) and a gear position (gearpos) at present;

wherein the gear position (gearpos) at present includes a neutral position at which none of the even number stage side gears and the odd number stage side gears of the multi-speed transmission is in an in-gear state, and when the gear position (gearpos) at present is the neutral position, the manual operation clutch decision section carries out a decision to interlock the manual operation clutch capacity arithmetic operation value (tqc1tmt) with an odd number stage side clutch capacity (tqc1).

5. The twin clutch controlling apparatus according to claim 4, wherein the gear position (gearpos) at present includes a position at which both of an even number stage side gear and an odd number stage side gear of the multi-speed transmission exhibit an in-gear state and a position at which only one of the odd number stage side gears or the even number stage side gears exhibits an in-gear state, and the manual operation clutch decision section carries out, when the gear position (gearpos) at present is the position at which one of the odd number stage side gears or the even number stage side gears exhibits an in-gear state, a decision to interlock the manual operation clutch capacity arithmetic operation value (tqc1tmt) with the clutch capacity (tqc1, tqc2) on the side on which the in-gear state is exhibited.

6. The twin clutch controlling apparatus according to claim 5, wherein the manual operation clutch decision section determines, where the gear position (gearpos) at present is a position at which both of the even number stage side gear and the odd number stage side gear are in an in-gear state, that one of the clutches which is positioned nearer to the target gear position (gptgt) as a selection candidate, carries out, when the clutch determined as the selection candidate and a currently decided clutch coincide with each other, a decision to interlock the manual operation clutch capacity arithmetic operation value (tqc1tmt) with the clutch capacity (tqc1, tqc2) of the selection candidate, and in contrast, carries out, when the clutch determined as the selection candidate and the currently decided clutch do not coincide with each other, a decision to interlock the manual operation clutch capacity arithmetic operation value (tqc1tmt) with that one of the clutches which is positioned nearer to the target gear position (gptgt) at a point in time at which the manual operation clutch capacity arithmetic operation value (tqc1tmt) becomes equal to or lower than a predetermined value or at another point in time at which the manual operation clutch capacity arithmetic operation value (tqc1tmt) changes in a connection direction.

7. A twin clutch controlling apparatus comprising:

a multi-speed transmission having a plurality of gear trains between a main shaft on the input side and a countershaft on the output side, said main shaft including an inner main shaft and an outer main shaft coaxially arranged relative to each other;

a shift actuator for carrying out a changeover of a shift stage of the multi-speed transmission;

a twin clutch configured from an odd number stage side clutch and an even number stage side clutch for connecting and disconnecting power transmission, said twin clutch including a first clutch attached against rotation on the inner main shaft for supporting odd number stage side gears and a second clutch attached to the outer main shaft for supporting even number stage side gears, said first clutch and said second clutch being juxtapositioned relative to each other on one side of the multi-speed transmission;

a clutch actuator for controlling the twin clutch;

a manual operation clutch capacity arithmetic operation section for converting an operational amount of a clutch manual operation means to arithmetically operate a manual operation clutch capacity arithmetic operation value (tqc1tmt) corresponding to the manual operation; and a manual operation clutch decision section for determining with a clutch capacity (tqc1, tqc2) of which one of the odd number stage side clutch or the even number stage side clutch the manual operation clutch capacity arithmetic operational value (tqc1tmt) is to be interlocked, said decision by the manual operation clutch decision section being executed at least based on a target gear position (gptgt) and a gear position (gearpos);

wherein the gear position (gearpos) at present includes a neutral position at which none of the even number stage side gears and the odd number stage side gears of the multi-speed transmission is in an in-gear state, and when the gear position (gearpos) at present is the neutral position, the manual operation clutch decision section carries out a decision to interlock the manual operation clutch capacity arithmetic operation value (tqc1tmt) with an odd number stage side clutch capacity (tqc1 ).

8. The twin clutch controlling apparatus according to claim 7, wherein the gear position (gearpos) at present includes a position at which both of an even number stage side gear and an odd number stage side gear of the multi-speed transmission exhibit an in-gear state and a position at which only one of the odd number stage side gears or the even number stage side gears exhibits an in-gear state, and the manual operation clutch decision section carries out, when the gear position (gearpos) at present is the position at which one of the odd number stage side gears or the even number stage side gears exhibits an in-gear state, a decision to interlock the manual operation clutch capacity arithmetic operation value (tqc1tmt) with the clutch capacity (tqc1, tqc2) on the side on which the in-gear state is exhibited.

9. The twin clutch controlling apparatus according to claim 8, wherein the manual operation clutch decision section determines, where the gear position (gearpos) at present is a position at which both of the even number stage side gear and the odd number stage side gear are in an in-gear state, that one of the clutches which is positioned nearer to the target gear position (gptgt) as a selection candidate, carries out, when the clutch determined as the selection candidate and the currently decided clutch coincide with each other, a decision to interlock the manual operation clutch capacity arithmetic operation value (tqc1tmt) with the clutch capacity (tqc1, tqc2) of the selection candidate, and in contrast, carries out, when the clutch determined as the selection candidate and a currently decided clutch do not coincide with each other, a decision to interlock the manual operation clutch capacity arithmetic operation value (tqc1tmt) with that one of the clutches which is positioned nearer to the target gear position (gptgt) at a point in time at which the manual operation clutch capacity arithmetic operation value (tqc1tmt) becomes equal to or lower than a predetermined value or at another point in time at which the manual operation clutch capacity arithmetic operation value (tqc1tmt) changes in a connection direction.

* * * * *